United States Patent
Yoshida et al.

(10) Patent No.: US 12,189,107 B2
(45) Date of Patent: Jan. 7, 2025

(54) SCANNING OPTICAL SYSTEM AND SCANNING-TYPE CONFOCAL MICROSCOPE

(71) Applicant: Nikon Corporation, Tokyo (JP)

(72) Inventors: Yuki Yoshida, Yokohama (JP); Fumio Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 928 days.

(21) Appl. No.: 17/268,464

(22) PCT Filed: Aug. 27, 2018

(86) PCT No.: PCT/JP2018/031614
§ 371 (c)(1),
(2) Date: May 10, 2021

(87) PCT Pub. No.: WO2020/044410
PCT Pub. Date: Mar. 5, 2020

(65) Prior Publication Data
US 2021/0302709 A1 Sep. 30, 2021

(51) Int. Cl.
*G02B 21/00* (2006.01)
*G02B 13/00* (2006.01)
(Continued)

(52) U.S. Cl.
CPC ..... *G02B 21/0076* (2013.01); *G02B 13/0045* (2013.01); *G02B 21/0032* (2013.01); *G02B 21/02* (2013.01); *G02B 27/0031* (2013.01)

(58) Field of Classification Search
CPC ............ G02B 21/0076; G02B 13/0045; G02B 21/0032; G02B 21/02; G02B 27/0031
(Continued)

(56) References Cited

U.S. PATENT DOCUMENTS

2007/0153367 A1 7/2007 Kawasaki
2008/0149867 A1* 6/2008 Konishi ............. G02B 21/0064
359/659
(Continued)

FOREIGN PATENT DOCUMENTS

EP 2169442 A1 * 3/2010 ......... G02B 21/0036
JP 2011-128273 A 6/2011
(Continued)

OTHER PUBLICATIONS

Office Action issued Mar. 31, 2022, in Japanese Patent Application No. 2020-539184.
(Continued)

*Primary Examiner* — Stephone B Allen
*Assistant Examiner* — Boutsikaris Leonidas
(74) *Attorney, Agent, or Firm* — Potomac Law Group, PLLC

(57) ABSTRACT

A scanning optical system (SL) comprises a first lens group (G1) having a negative refractive power, a second lens group (G2) having a positive refractive power, and a third lens group (G3) having a negative refractive power. At least one lens included in any of the first to the third lens groups has a positive refractive power, and satisfies the conditional expression "vd1>80". At least one lens included in any of the first to the third lens group has a negative refractive power, and satisfies the conditional expression "vd2<50". The scanning optical system satisfies the conditional expression "h max≥18.0 [mm]".

16 Claims, 16 Drawing Sheets

(51) Int. Cl.
  *G02B 21/02* (2006.01)
  *G02B 27/00* (2006.01)
(58) Field of Classification Search
  USPC ........................................................ 359/385
  See application file for complete search history.

(56) References Cited

U.S. PATENT DOCUMENTS

| | | | |
|---|---|---|---|
| 2011/0304929 A1 | 12/2011 | Tsutsumi | |
| 2011/0317285 A1* | 12/2011 | Ohashi | G02B 27/0025 359/753 |
| 2019/0212525 A1* | 7/2019 | Abe | G02B 13/06 |

FOREIGN PATENT DOCUMENTS

| | | |
|---|---|---|
| JP | 2012-173491 A | 9/2012 |
| JP | 2013-054146 A | 3/2013 |

OTHER PUBLICATIONS

International Search Report from International Patent Application No. PCT/JP2018/031614, Nov. 6, 2018.
International Preliminary Report on Patentability (including English Translation of Written Opinion of the ISA) from International Patent Application No. PCT/JP2018/031614, Mar. 11, 2021.
Office Action issued Oct. 4, 2022, in Japanese Patent Application No. 2020-539184.

* cited by examiner

SCANNING OPTICAL SYSTEM AND SCANNING-TYPE CONFOCAL MICROSCOPE

TECHNICAL FIELD

The present invention relates to a scanning optical system, and a scanning-type confocal microscope.

TECHNICAL BACKGROUND

A scanning fluorescence microscope is provided with a pupil projection lens arranged between scanning means and an objective lens optical system (for example, see Patent literature 1).

PRIOR ARTS LIST

Patent Document

Patent literature 1: US Patent Application Publication No. 2007/0153367A1

SUMMARY OF THE INVENTION

A scanning optical system according to a first aspect is a scanning optical system provided between an objective lens and a scanning mechanism, comprising: a first lens group having a negative refractive power; a second lens group having a positive refractive power; and a third lens group having a negative refractive power, the lens groups being arranged sequentially from a side of the scanning mechanism, wherein at least one lens included in any of the first lens group, the second lens group and the third lens group has a positive refractive power, and satisfies the following conditional expression, $\nu d1 > 80$, at least one lens included in any of the first lens group, the second lens group and the third lens group has a negative refractive power, and satisfies the following conditional expression, $\nu d2 < 50$, and the scanning optical system satisfies the following conditional expression, $h$ max $\geq 18.0$ [mm]

where h max: a maximum distance between an optical axis and a principal ray defining a maximum image height among principal rays passing through a back focus of the objective lens, νd1: an Abbe number with reference to d-line of the lens having the positive refractive power, defined by the following expression, $\nu d1 = (nd1-1)/(nF1-nC1)$, wherein a refractive index of the lens having the positive refractive power for d-line is nd1, a refractive index of the lens having the positive refractive power for F-line is nF1, and a refractive index of the lens having the positive refractive power for C-line is nC1, and νd2: an Abbe number with reference to d-line of the lens having the negative refractive power, defined by the following expression, $\nu d2 = (nd2-1)/(nF2-nC2)$, wherein a refractive index of the lens having the negative refractive power for d-line is nd2, a refractive index of the lens having the negative refractive power for F-line is nF2, and a refractive index of the lens having the negative refractive power for C-line is nC2.

A scanning optical system according to a second aspect is a scanning optical system provided between an objective lens and a scanning mechanism, comprising: a first lens group having a negative refractive power; a second lens group having a positive refractive power; and a third lens group having a negative refractive power, the lens groups being arranged sequentially from a side of the scanning mechanism, wherein at least one lens included in any of the first lens group, the second lens group and the third lens group has a positive refractive power, and satisfies the following conditional expression, $\theta gF1 - (-0.00168 \times \nu d1) - 0.644 > 0.03$ at least one lens included in any of the first lens group, the second lens group and the third lens group has a negative refractive power, and satisfies the following conditional expression, $\theta gF2 - (-0.00168 \times \nu d2) - 0.644 < -0.002$, and the scanning optical system satisfies the following conditional expression, $h$ max $\geq 18.0$ [mm]

where h max: a maximum distance between an optical axis and a principal ray defining a maximum image height among principal rays passing through a back focus of the objective lens, νd1: an Abbe number with reference to d-line of the lens having the positive refractive power, defined by the following expression, $\nu d1 = (nd1-1)/(nF1-nC1)$, wherein a refractive index of the lens having the positive refractive power for d-line is nd1, a refractive index of the lens having the positive refractive power for F-line is nF1, and a refractive index of the lens having the positive refractive power for C-line is nC1, νd2: an Abbe number with reference to d-line of the lens having the negative refractive power, defined by the following expression, $\nu d2 = (nd2-1)/(nF2-nC2)$, wherein a refractive index of the lens having the negative refractive power for d-line is nd2, a refractive index of the lens having the negative refractive power for F-line is nF2, and a refractive index of the lens having the negative refractive power for C-line is nC2, θgF1: a partial dispersion ratio of the lens having the positive refractive power, defined by the following expression, $\theta gF1 = (ng1-nF1)/(nF1-nC1)$, wherein a refractive index of the lens having the positive refractive power for g-line is ng1, a refractive index of the lens having the positive refractive power for F-line is nF1, and a refractive index of the lens having the positive refractive power for C-line is nC1, θgF2: a partial dispersion ratio of the lens having the negative refractive power, defined by the following expression, $\theta gF2 = (ng2-nF2)/(nF2-nC2)$, wherein a refractive index of the lens having the negative refractive power for g-line is ng2, a refractive index of the lens having the negative refractive power for F-line is nF2, and a refractive index of the lens having the negative refractive power for C-line is nC2.

A scanning optical system according to a third aspect is a scanning optical system provided between an objective lens and a scanning mechanism, comprising: a first lens group having a negative refractive power; a second lens group having a positive refractive power; and a third lens group having a negative refractive power, the lens groups being arranged sequentially from a side of the scanning mechanism, wherein at least one lens included in any of the first lens group, the second lens group and the third lens group has a positive refractive power, and satisfies the following conditional expression, $vd1>80$, at least one lens included in any of the first lens group, the second lens group and the third lens group has a negative refractive power, and satisfies the following conditional expression, $vd2<50$, and the scanning optical system satisfies the following conditional expression, FOV≥23 [mm]

where FOV: a maximum number of fields of view of the scanning optical system,
vd1: an Abbe number with reference to d-line of the lens having the positive refractive power, defined by the following expression, $vd1=(nd1-1)/(nF1-nC1)$, wherein a refractive index of the lens having the positive refractive power for d-line is nd1, a refractive index of the lens having the positive refractive power for F-line is nF1, and a refractive index of the lens having the positive refractive power for C-line is nC1,
vd2: an Abbe number with reference to d-line of the lens having the negative refractive power, defined by the following expression, $vd2=(nd2-1)/(nF2-nC2)$, wherein a refractive index of the lens having the negative refractive power for d-line is nd2, a refractive index of the lens having the negative refractive power for F-line is nF2, and a refractive index of the lens having the negative refractive power for C-line is nC2.

A scanning optical system according to a fourth aspect is a scanning optical system provided between an objective lens and a scanning mechanism, comprising: a first lens group having a negative refractive power; a second lens group having a positive refractive power; and a third lens group having a negative refractive power, the lens groups being arranged sequentially from a side of the scanning mechanism, wherein at least one lens included in any of the first lens group, the second lens group and the third lens group has a positive refractive power, and satisfies the following conditional expression, $\theta gF1-(-0.00168 \times vd1)-0.644>0.03$, at least one lens included in any of the first lens group, the second lens group and the third lens group has a negative refractive power, and satisfies the following conditional expression, $\theta gF2-(-0.00168 \times vd2)-0.644<-0.002$, and the scanning optical system satisfies the following conditional expression, FOV≥23 [mm]

where FOV: a maximum number of fields of view of the scanning optical system,
vd1: an Abbe number with reference to d-line of the lens having the positive refractive power, defined by the following expression, $vd1=(nd1-1)/(nF1-nC1)$, wherein a refractive index of the lens having the positive refractive power for d-line is nd1, a refractive index of the lens having the positive refractive power for F-line is nF1, and a refractive index of the lens having the positive refractive power for C-line is nC1,
vd2: an Abbe number with reference to d-line of the lens having the negative refractive power, defined by the following expression, $vd2=(nd2-1)/(nF2-nC2)$, wherein a refractive index of the lens having the negative refractive power for d-line is nd2, a refractive index of the lens having the negative refractive power for F-line is nF2, and a refractive index of the lens having the negative refractive power for C-line is nC2,
θgF1: a partial dispersion ratio of the lens having the positive refractive power, defined by the following expression, $\theta gF1=(ng1-nF1)/(nF1-nC1)$, wherein a refractive index of the lens having the positive refractive power for g-line is ng1, a refractive index of the lens having the positive refractive power for F-line is nF1, and a refractive index of the lens having the positive refractive power for C-line is nC1,
θgF2: a partial dispersion ratio of the lens having the negative refractive power, defined by the following expression, $\theta gF2=(ng2-nF2)/(nF2-nC2)$, wherein a refractive index of the lens having the negative refractive power for g-line is ng2, a refractive index of the lens having the negative refractive power for F-line is nF2, and a refractive index of the lens having the negative refractive power for C-line is nC2.

A scanning optical system according to a fifth aspect is a scanning optical system provided between an objective lens and a scanning mechanism, comprising: a first lens group having a negative refractive power; a second lens group having a positive refractive power; and a third lens group having a negative refractive power, the lens groups being arranged sequentially from a side of the scanning mechanism, wherein at least one lens included in any of the first lens group, the second lens group and the third lens group has a positive refractive power, and satisfies the following conditional expression, $vd1>80$, at least one lens included in any of the first lens group, the second lens group and the third lens group has a negative refractive power, and satisfies the following conditional expression, $vd2<50$, and the scanning optical system satisfies the following conditional expression, Φ max≥48.0 [mm]

where Φ max: a maximum outer diameter of the scanning optical system, vd1: an Abbe number with reference to d-line of the lens having the positive refractive power, defined by the following expression, $$vd1=(nd1-1)/(nF1-nC1),$$

wherein a refractive index of the lens having the positive refractive power for d-line is nd1, a refractive index of the lens having the positive refractive power for F-line is nF1, and a refractive index of the lens having the positive refractive power for C-line is nC1, vd2: an Abbe number with reference to d-line of the lens having the negative refractive power, defined by the following expression, $$vd2=(nd2-1)/(nF2-nC2),$$

wherein a refractive index of the lens having the negative refractive power for d-line is nd2, a refractive index of the lens having the negative refractive power for F-line is nF2, and a refractive index of the lens having the negative refractive power for C-line is nC2.

A scanning optical system according to a sixth aspect is a scanning optical system provided between an objective lens and a scanning mechanism, comprising: a first lens group having a negative refractive power; a second lens group having a positive refractive power; and a third lens group having a negative refractive power, the lens groups being arranged sequentially from a side of the scanning mechanism, wherein at least one lens included in any of the first lens group, the second lens group and the third lens group has a positive refractive power, and satisfies the following conditional expression, $$\theta gF1-(-0.00168 \times vd1)-0.644>0.03,$$

at least one lens included in any of the first lens group, the second lens group and the third lens group has a negative refractive power, and satisfies the following conditional expression, $$\theta gF2-(-0.00168 \times vd2)-0.644<-0.002, \text{ and}$$

the scanning optical system satisfies the following conditional expression, $$\Phi \text{ max} \geq 48.0 \text{ [mm]}$$

where Φ max: a maximum outer diameter of the scanning optical system, vd1: an Abbe number with reference to d-line of the lens having the positive refractive power, defined by the following expression, $$vd1=(nd1-1)/(nF1-nC1),$$

wherein a refractive index of the lens having the positive refractive power for d-line is nd1, a refractive index of the lens having the positive refractive power for F-line is nF1, and a refractive index of the lens having the positive refractive power for C-line is nC1, vd2: an Abbe number with reference to d-line of the lens having the negative refractive power, defined by the following expression, $$vd2=(nd2-1)/(nF2-nC2),$$

wherein a refractive index of the lens having the negative refractive power for d-line is nd2, a refractive index of the lens having the negative refractive power for F-line is nF2, and a refractive index of the lens having the negative refractive power for C-line is nC2, θgF1: a partial dispersion ratio of the lens having the positive refractive power, defined by the following expression, $$\theta gF1=(ng1-nF1)/(nF1-nC1),$$

wherein a refractive index of the lens having the positive refractive power for g-line is ng1, a refractive index of the lens having the positive refractive power for F-line is nF1, and a refractive index of the lens having the positive refractive power for C-line is nC1, θgF2: a partial dispersion ratio of the lens having the negative refractive power, defined by the following expression, $$\theta gF2=(ng2-nF2)/(nF2-nC2),$$

wherein a refractive index of the lens having the negative refractive power for g-line is ng2, a refractive index of the lens having the negative refractive power for F-line is nF2, and a refractive index of the lens having the negative refractive power for C-line is nC2.

A scanning-type confocal microscope according to a seventh aspect is a scanning-type confocal microscope, comprising: the objective lens, the scanning mechanism, and the scanning optical system according to the first to sixth aspects.

DESCRIPTION OF THE EMBODIMENTS

Figure 1:
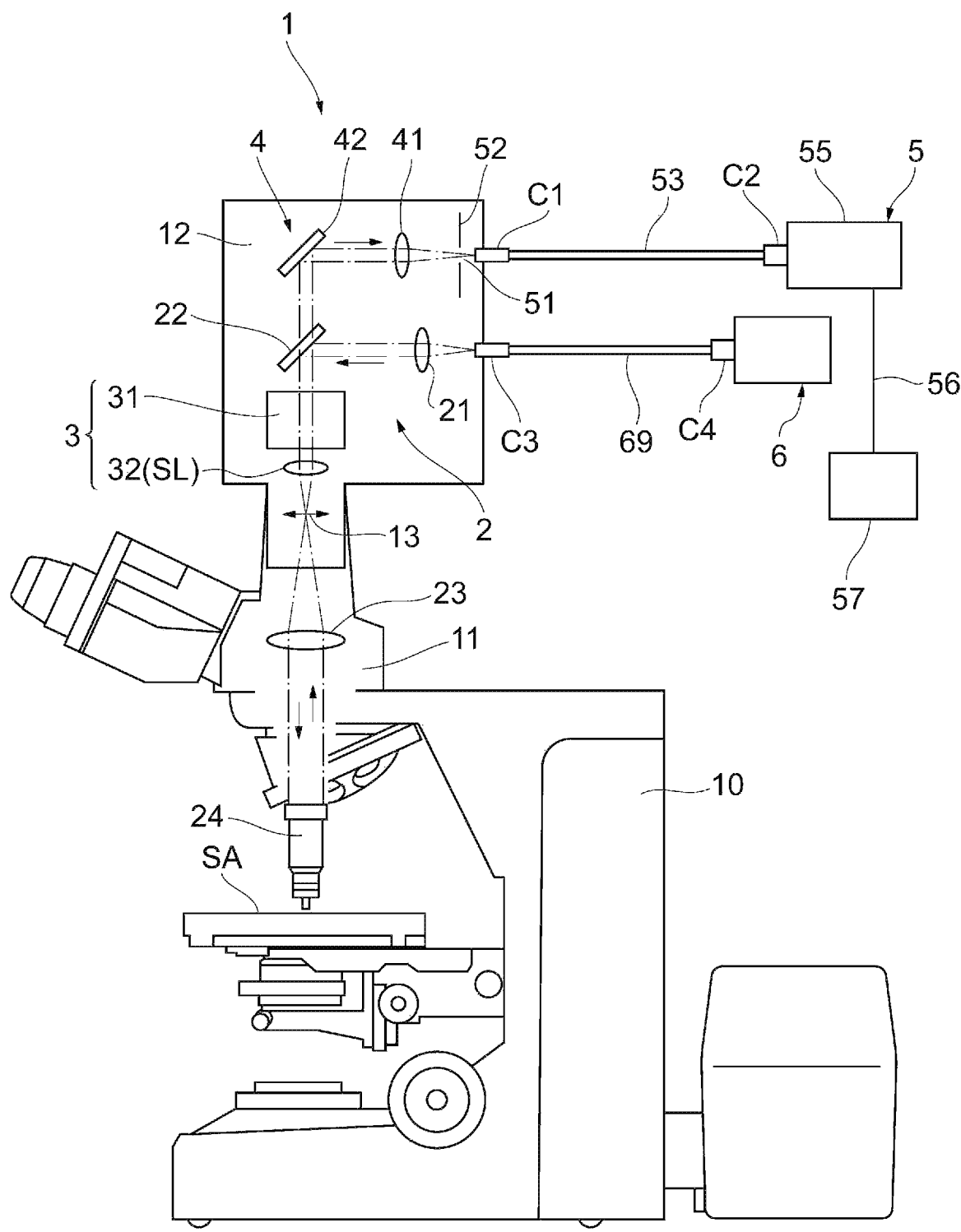
FIG. 1 illustrates a configuration of a scanning-type confocal microscope that comprises a scanning optical system.

Hereinafter, scanning optical systems and scanning-type confocal microscopes according to first to sixth embodiments are described. First, referring to FIG. 1, the scanning-type confocal microscopes that comprise the scanning optical systems according to the first to sixth embodiments are described. The scanning-type confocal microscope 1 mainly comprises: a first collective optical system 2 that collects laser light for illumination from a light source unit 6 onto a sample SA; a scanning device 3 that deflects the laser light collected on the sample SA and scans the sample SA with the laser light; an optical detection device 5 that detects a light intensity signal from the sample SA; and a second collective optical system 4 that guides the light from the sample SA to the optical detection device 5.

The first collective optical system 2 comprises: a collimator lens 21 that converts oscillated laser light (a light flux) from the light source unit 6 into parallel light; a dichroic mirror 22 that reflects the laser light from the collimator lens 21 toward the sample SA; and a second objective lens 23 and an objective lens 24 that collect the laser light reflected by the dichroic mirror 22 onto the sample SA. The second objective lens 23 is arranged in a lens barrel 11 of a microscope main body 10, and the collimator lens 21 and the dichroic mirror 22 are arranged in a microscope housing 12 provided above the lens barrel 11. Note that the light source unit 6 and the microscope housing 12 are connected to each other by an optical fiber 69 using connectors C3 and C4.

The scanning device 3 comprises a scanning mechanism (scanner) 31 that includes, for example, a galvanometer mirror (not shown) or a resonant mirror (not shown), and a scanning optical system 32, and is arranged between the dichroic mirror 22 in the microscope housing 12 and the second objective lens 23. The scanning mechanism (scanner) 31 deflects incident laser light. That is, the scanning mechanism (scanner) 31 deflects the laser light collected on the sample SA and scans the sample SA with the laser light. The scanning optical system 32 is an optical system provided between the objective lens 24 and the scanning mechanism (scanner) 31. The scanning optical system 32 is an optical system whose focal position is disposed on an image surface I conjugate with the sample SA (a scanning surface of the sample SA).

The second collective optical system 4 comprises: the objective lens 24 and the second objective lens 23; a total reflection mirror 42 that reflects fluorescent light from the sample SA; and a first collective lens 41 that collects the fluorescent light reflected by the total reflection mirror 42 onto a shielding plate 52 that is of the optical detection device 5 and includes a pinhole 51. The total reflection mirror 42 and the first collective lens 41 are arranged above the dichroic mirror 22 and the collimator lens 21 in the microscope housing 12.

The optical detection device 5 comprises: the shielding plate 52 having the pinhole 51 (aperture); an optical fiber 53 that allows light (fluorescent light) having passed through the pinhole 51 to be incident thereon; and a detection unit 55 that detects the light (fluorescent light) having passed through the pinhole 51 and the optical fiber 53. The shielding plate 52 is arranged in the microscope housing 12. The optical fiber 53 is connected to the microscope housing 12 and the detection unit 55 using respective connectors C1 and C2. A processing unit 57 is electrically connected to the detection unit 55 via a cable 56. Image processing (of the sample SA) based on a detection signal detected by the detection unit 55 is performed, and an observation image of the sample SA obtained through the image processing by the processing unit 57 is displayed on a monitor, not shown. Note that, in the configuration, illumination light emitted from the scanning device 3 is collected on an imaging surface (primary image surface) 13, and is then collected on the sample SA by the second objective lens 23 and the objective lens 24. A scanning surface of the sample SA, the imaging surface 13, and the pinhole 51 have a conjugate relationship.

An after-mentioned scanning optical system SL according to each embodiment can be used as the scanning optical system 32. First, a first embodiment of the scanning optical system SL is described. As with a scanning optical system SL(1) shown in FIG. 2, the scanning optical system SL according to the first embodiment comprises, for example: a first lens group G1 having a negative refractive power; a second lens group G2 having a positive refractive power; and a third lens group G3 having a negative refractive power, the lens groups being arranged sequentially from the side of the scanning mechanism 31 (pupil conjugate surface P). By arranging the first lens group G1 and the third lens group G3 that have the negative refractive powers before and after the second lens group G2 having the positive refractive power, the Petzval sum can be reduced close to zero, and the field curves can be favorably corrected.

Figure 4:
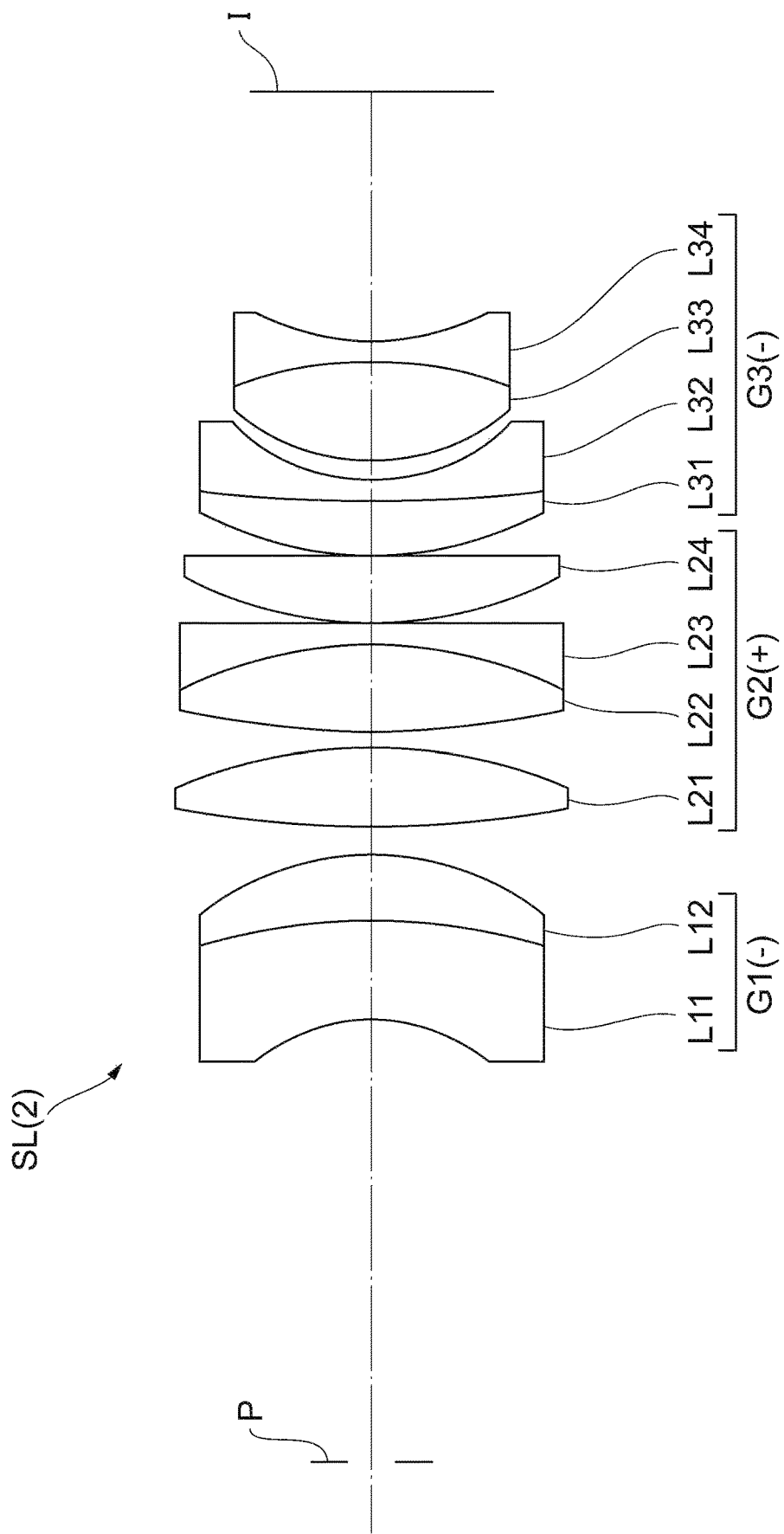
FIG. 4 is a lens configuration diagram of a scanning optical system according to a second example.
Figure 6:
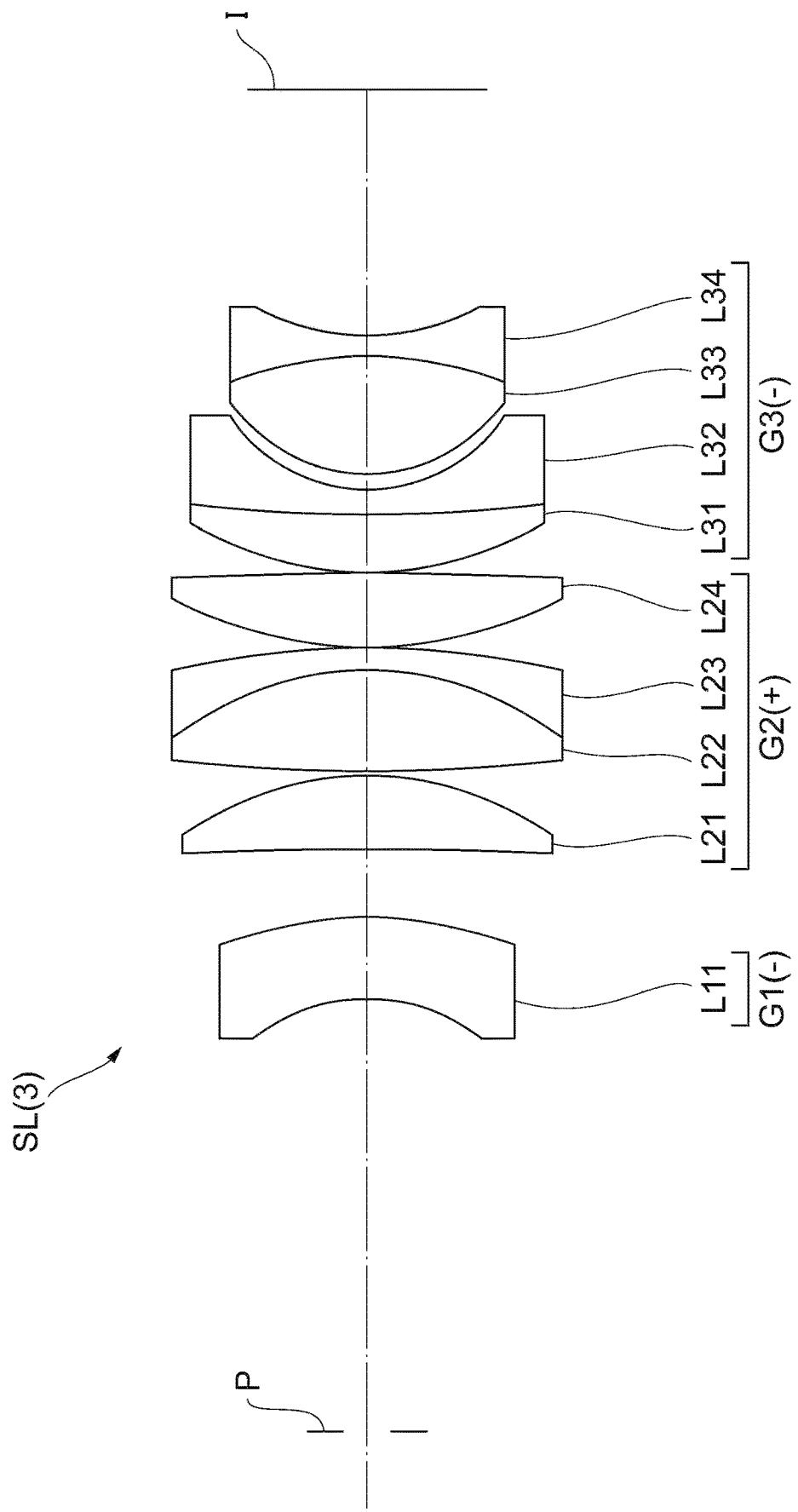
FIG. 6 is a lens configuration diagram of a scanning optical system according to a third example.
Figure 8:
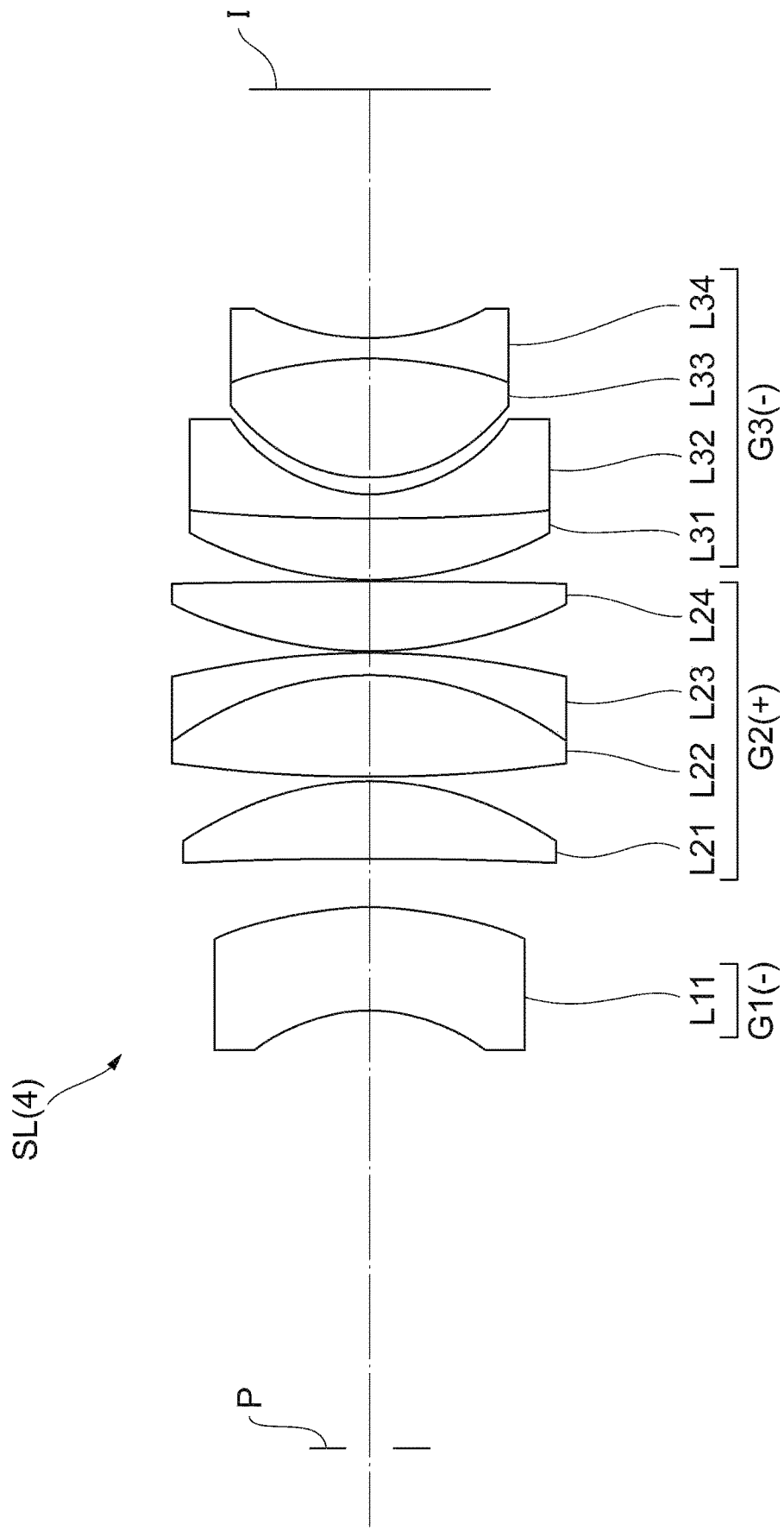
FIG. 8 is a lens configuration diagram of a scanning optical system according to a fourth example.

The scanning optical system SL according to the first embodiment may be a scanning optical system SL(2) shown in FIG. 4, a scanning optical system SL(3) shown in FIG. 6, or a scanning optical system SL(4) shown in FIG. 8. The scanning optical system SL according to the first embodiment may be a scanning optical system SL(5) shown in FIG. 10, a scanning optical system SL(6) shown in FIG. 12, or a scanning optical system SL(7) shown in FIG. 14.

In the scanning optical system SL according to the first embodiment, at least one lens included in any of the first lens group G1, the second lens group G2 and the third lens group G3 has a positive refractive power, and satisfies the following conditional expression (1), $$\nu d1 > 80 \tag{1}$$

where $\nu d1$: an Abbe number with reference to d-line of the lens having the positive refractive power, defined by the following expression, $$\nu d1 = (nd1-1)/(nF1-nC1),$$

wherein a refractive index of the lens having the positive refractive power for d-line is nd1, a refractive index of the lens having the positive refractive power for F-line is nF1, and a refractive index of the lens having the positive refractive power for C-line is nC1.

The conditional expression (1) defines the Abbe number of the material of the lens having the positive refractive power. The lens having the positive refractive power satisfies the conditional expression (1), which reduces the dispersion of light in the lens having the positive refractive power. Accordingly, the chromatic aberration of magnification can be favorably corrected.

If the corresponding value of the conditional expression (1) falls below the lower limit value, the dispersion of light in the lens having the positive refractive power increases. Accordingly, it is difficult to correct the chromatic aberration of magnification. By setting the lower limit value of the conditional expression (1) to 90, the advantageous effects of this embodiment can be more secured.

In the scanning optical system SL according to the first embodiment, at least one lens included in any of the first lens group G1, the second lens group G2 and the third lens group G3 has a negative refractive power, and satisfies the following conditional expression (2), $$\nu d2 < 50 \tag{2}$$

where vd2: an Abbe number with reference to d-line of the lens having the negative refractive power, defined by the following expression, $$vd1=(nd1-1)/(nF1-nC1),$$

wherein a refractive index of the lens having the negative refractive power for d-line is nd2, a refractive index of the lens having the negative refractive power for F-line is nF2, and a refractive index of the lens having the negative refractive power for C-line is nC2.

$$vd2=(nd2-1)/(nF2-nC2).$$

The conditional expression (2) defines the Abbe number of the material of the lens having the negative refractive power. The lens having the negative refractive power satisfies the conditional expression (2), and the lens having the strong negative refractive power with the large dispersion of light is combined with the lenses having the positive refractive powers with the small dispersion of light. Accordingly, the chromatic aberration of magnification can be favorably corrected.

If the corresponding value of the conditional expression (2) exceeds an upper limit value, the dispersion of light of the lens having the negative refractive power decreases. Accordingly, it is difficult to correct the chromatic aberration of magnification through combination with the lens having the positive refractive power (with a small dispersion of light). By setting the upper limit value of the conditional expression (2) to 40, the advantageous effects of this embodiment can be more secured.

The scanning optical system SL according to the first embodiment satisfies the following conditional expression (3).

$$h\ max \geq 18.0\ [\text{mm}] \tag{3}$$

where h max: a maximum distance between an optical axis and a principal ray defining a maximum image height among principal rays passing through a back focus of the objective lens 24.

The conditional expression (3) defines a maximum distance between an optical axis and a principal ray defining a maximum image height among principal rays passing through a back focus of the objective lens 24. The conditional expression (3) is satisfied, which increases the maximum image height, and increases the maximum number of fields of view of the scanning optical system SL accordingly, thereby allowing the field of view to be increased. According to the first embodiment, the conditional expressions (1) to (3) are satisfied, which can reduce the chromatic aberration of magnification, and increase the field of view.

Note that the principal ray is a ray passing through the center of the aperture stop. Typically, an objective lens of a microscope is assumed to be telecentric. The back focus position of the objective lens is the position of the exit pupil (aperture stop) of the objective lens. Accordingly, the principal ray of the scanning optical system SL of the scanning-type confocal microscope 1 passes through the back focus of the objective lens 24. At a position closer to the scanning mechanism 31 than the scanning optical system SL, the pupil conjugate surface P conjugate with the exit pupil of the objective lens 24. The scanning mechanism 31 is arranged at a neighborhood of the pupil conjugate surface P. In each embodiment, the maximum number of fields of view of the scanning optical system SL indicates the diameter of the image surface I conjugate with the sample SA (the scanning surface of the sample SA), that is, the diameter of the imaging surface 13 (primary image surface) by the second objective lens 23.

If the corresponding value of the conditional expression (3) falls below the lower limit value, the maximum image height decreases, and the maximum number of fields of view of the scanning optical system SL decreases accordingly. It is difficult to increase the field of view. By setting the lower limit value of the conditional expression (3) to 18.3 [mm], the advantageous effects of this embodiment can be more secured.

In the scanning optical system SL according to the first embodiment, at least one lens having the positive refractive power described above may satisfy the following conditional expression (4).

$$\theta gF1-(-0.00168 \times vd1)-0.644 > 0.03 \tag{4}$$

where θgF1: a partial dispersion ratio of the lens having the positive refractive power, defined by the following expression, $$\theta gF1=(ng1-nF1)/(nF1-nC1),$$

wherein a refractive index of the lens having the positive refractive power for g-line is ng1, a refractive index of the lens having the positive refractive power for F-line is nF1, and a refractive index of the lens having the positive refractive power for C-line is nC1.

The conditional expression (4) defines the relationship between the partial dispersion ratio and the Abbe number of the material of the lens having the positive refractive power. The lens having the positive refractive power satisfies the conditional expression (4), which can favorably correct the chromatic aberration of magnification in the wavelength region of visible light, using the anomalous dispersion characteristics of the material of the lens having the positive refractive power.

If the corresponding value of the conditional expression (4) falls below the lower limit value, the effect of the anomalous dispersion characteristics becomes insufficient. Accordingly, it is difficult to correct the chromatic aberration of magnification. By setting the lower limit value of the conditional expression (4) to 0.04, the advantageous effects of this embodiment can be more secured.

In the scanning optical system SL according to the first embodiment, at least one lens having the negative refractive power described above may satisfy the following conditional expression (5).

$$\theta gF2-(-0.00168 \times vd2)-0.644 < -0.002 \tag{5}$$

where θgF2: a partial dispersion ratio of the lens having the negative refractive power, defined by the following expression, $$\theta gF2=(ng2-nF2)/(nF2-nC2),$$

wherein a refractive index of the lens having the negative refractive power for g-line is ng2, a refractive index of the lens having the negative refractive power for F-line is nF2, and a refractive index of the lens having the negative refractive power for C-line is nC2.

The conditional expression (5) defines the relationship between the partial dispersion ratio and the Abbe number of the material of the lens having the negative refractive power. The lens having the negative refractive power satisfies the conditional expression (5), which can favorably correct the chromatic aberration of magnification in the wavelength region of visible light, using the anomalous dispersion characteristics of the material of the lens having the negative refractive power.

If the corresponding value of the conditional expression (5) exceeds the upper limit value, the effect of the anomalous dispersion characteristics becomes insufficient. Accordingly, it is difficult to correct the chromatic aberration of magnification. By setting the upper limit value of the conditional expression (5) to −0.004, the advantageous effects of this embodiment can be more secured.

In the scanning optical system SL according to the first embodiment, at least one lens having the positive refractive power described above may satisfy the following conditional expression (6).

$$\theta gF1 < 0.55 \qquad (6)$$

The conditional expression (6) defines the partial dispersion ratio of the material of the lens having the positive refractive power. The lens having the positive refractive power satisfies the conditional expression (6), which can make the anomalous dispersion characteristics of the material of the lens having the positive refractive power appropriate, and favorably correct the chromatic aberration of magnification in the wavelength region of visible light.

If the corresponding value of the conditional expression (6) exceeds the upper limit value, the anomalous dispersion characteristics of the material of the lens having the positive refractive power become excessive. Accordingly, it is difficult to correct the chromatic aberration of magnification. By setting the upper limit value of the conditional expression (6) to 0.535, the advantageous effects of this embodiment can be more secured.

In the scanning optical system SL according to the first embodiment, at least one lens having the negative refractive power described above may satisfy the following conditional expression (7)

$$\theta gF2 > 0.56 \qquad (7)$$

The conditional expression (7) defines the partial dispersion ratio of the material of the lens having the negative refractive power. The lens having the negative refractive power satisfies the conditional expression (7), which can make the anomalous dispersion characteristics of the material of the lens having the negative refractive power appropriate, and favorably correct the chromatic aberration of magnification in the wavelength region of visible light.

If the corresponding value of the conditional expression (7) falls below the lower limit value, the anomalous dispersion characteristics of the material of the lens having the negative refractive power become excessive. Accordingly, it is difficult to correct the chromatic aberration of magnification. By setting the lower limit value of the conditional expression (7) to 0.58, the advantageous effects of this embodiment can be more secured.

Next, a second embodiment of the scanning optical system is described. The scanning optical system according to the second embodiment has a configuration similar to that of the scanning optical system SL according to the first embodiment. Accordingly, the same symbols as those in the first embodiment are assigned and description is made. As with a scanning optical system SL(1) shown in FIG. 2, the scanning optical system SL according to the second embodiment comprises, for example: a first lens group G1 having a negative refractive power; a second lens group G2 having a positive refractive power; and a third lens group G3 having a negative refractive power, the lens groups being arranged sequentially from the side of the scanning mechanism 31 (pupil conjugate surface P). By arranging the first lens group G1 and the third lens group G3 that have the negative refractive powers before and after the second lens group G2 having the positive refractive power, the Petzval sum can be reduced close to zero, and the field curves can be favorably corrected.

The scanning optical system SL according to the second embodiment may be a scanning optical system SL(2) shown in FIG. 4, a scanning optical system SL(3) shown in FIG. 6, or a scanning optical system SL(4) shown in FIG. 8. The scanning optical system SL according to the second embodiment may be a scanning optical system SL(5) shown in FIG. 10, a scanning optical system SL(6) shown in FIG. 12, or a scanning optical system SL(7) shown in FIG. 14.

In the scanning optical system SL according to the second embodiment, at least one lens included in any of the first lens group G1, the second lens group G2 and the third lens group G3 has a positive refractive power, and satisfies the following conditional expression (4) described above, $$\theta gF1 - (-0.00168 \times vd1) - 0.644 > 0.03 \qquad (4)$$

The lens having the positive refractive power satisfies the conditional expression (4), which can favorably correct the chromatic aberration of magnification in the wavelength region of visible light, as with the first embodiment. Note that by setting the lower limit value of the conditional expression (4) to 0.04, the advantageous effects of this embodiment can be more secured.

In the scanning optical system SL according to the second embodiment, at least one lens included in any of the first lens group G1, the second lens group G2 and the third lens group G3 has a negative refractive power, and satisfies the following conditional expression (5) described above.

$$\theta gF2 - (-0.00168 \times vd2) - 0.644 < -0.002 \qquad (5)$$

The lens having the negative refractive power satisfies the conditional expression (5), which can favorably correct the chromatic aberration of magnification in the wavelength region of visible light, as with the first embodiment. Note that by setting the upper limit value of the conditional expression (5) to −0.004, the advantageous effects of this embodiment can be more secured.

The scanning optical system SL according to the second embodiment satisfies the following conditional expression (3) described above.

$$h\,\text{max} \geq 18.0\ [\text{mm}] \qquad (3)$$

By satisfying the conditional expression (3), the field of view can be increased, as with the first embodiment. According to the second embodiment, the conditional expressions (3) and (4)-(5) are satisfied, which can reduce the chromatic aberration of magnification, and increase the field of view. Note that by setting the lower limit value of the conditional expression (3) to 18.3 [mm], the advantageous effects of this embodiment can be more secured.

In the scanning optical system SL according to the second embodiment, at least one lens having the positive refractive power described above may satisfy the following conditional expression (1) described above.

$$vd1 > 80 \qquad (1)$$

The lens having the positive refractive power satisfies the conditional expression (1), which can favorably correct the chromatic aberration of magnification, as with the first embodiment. Note that by setting the lower limit value of the conditional expression (1) to 90, the advantageous effects of this embodiment can be more secured.

In the scanning optical system SL according to the second embodiment, at least one lens having the negative refractive power described above may satisfy the following conditional expression (2) described above.

$$vd2<50 \tag{2}$$

The lens having the negative refractive power satisfies the conditional expression (2), which can favorably correct the chromatic aberration of magnification, as with the first embodiment. Note that by setting the upper limit value of the conditional expression (2) to 40, the advantageous effects of this embodiment can be more secured.

In the scanning optical system SL according to the second embodiment, at least one lens having the positive refractive power described above may satisfy the following conditional expression (6) described above.

$$\theta gF1<0.55 \tag{6}$$

The lens having the positive refractive power satisfies the conditional expression (6), which can favorably correct the chromatic aberration of magnification in the wavelength region of visible light, as with the first embodiment. Note that by setting the upper limit value of the conditional expression (6) to 0.535, the advantageous effects of this embodiment can be more secured.

In the scanning optical system SL according to the second embodiment, at least one lens having the negative refractive power described above may satisfy the following conditional expression (7) described above.

$$\theta gF2>0.56 \tag{7}$$

The lens having the negative refractive power satisfies the conditional expression (7), which can favorably correct the chromatic aberration of magnification in the wavelength region of visible light, as with the first embodiment. Note that by setting the lower limit value of the conditional expression (7) to 0.58, the advantageous effects of this embodiment can be more secured.

Next, a third embodiment of the scanning optical system SL is described. The scanning optical system according to the third embodiment has a configuration similar to that of the scanning optical system SL according to the first embodiment. Accordingly, the same symbols as those in the first embodiment are assigned and description is made. As with a scanning optical system SL(1) shown in FIG. 2, the scanning optical system SL according to the third embodiment comprises, for example: a first lens group G1 having a negative refractive power; a second lens group G2 having a positive refractive power; and a third lens group G3 having a negative refractive power, the lens groups being arranged sequentially from the side of the scanning mechanism 31 (pupil conjugate surface P). By arranging the first lens group G1 and the third lens group G3 that have the negative refractive powers before and after the second lens group G2 having the positive refractive power, the Petzval sum can be reduced close to zero, and the field curves can be favorably corrected.

The scanning optical system SL according to the third embodiment may be a scanning optical system SL(2) shown in FIG. 4, a scanning optical system SL(3) shown in FIG. 6, or a scanning optical system SL(4) shown in FIG. 8. The scanning optical system SL according to the third embodiment may be a scanning optical system SL(5) shown in FIG. 10, a scanning optical system SL(6) shown in FIG. 12, or a scanning optical system SL(7) shown in FIG. 14.

In the scanning optical system SL according to the third embodiment, at least one lens included in any of the first lens group G1, the second lens group G2 and the third lens group G3 has a positive refractive power, and satisfies the following conditional expression (1) described above.

$$vd1>80 \tag{1}$$

The lens having the positive refractive power satisfies the conditional expression (1), which can favorably correct the chromatic aberration of magnification, as with the first embodiment. Note that by setting the lower limit value of the conditional expression (1) to 90, the advantageous effects of this embodiment can be more secured.

In the scanning optical system SL according to the third embodiment, at least one lens included in any of the first lens group G1, the second lens group G2 and the third lens group G3 has a negative refractive power, and satisfies the following conditional expression (2) described above.

$$vd2<50 \tag{2}$$

The lens having the negative refractive power satisfies the conditional expression (2), which can favorably correct the chromatic aberration of magnification, as with the first embodiment. Note that by setting the upper limit value of the conditional expression (2) to 40, the advantageous effects of this embodiment can be more secured.

The scanning optical system SL according to the third embodiment satisfies the following conditional expression (8).

$$FOV \geq 23 \text{ [mm]} \tag{8}$$

where FOV: the maximum number of fields of view of the scanning optical system SL.

The conditional expression (8) defines the maximum number of fields of view of the scanning optical system SL. The conditional expression (8) is satisfied, which increases the maximum number of fields of view of the scanning optical system SL, thereby allowing the field of view to be increased. According to the second embodiment, the conditional expressions (1), (2) and (8) are satisfied, which can reduce the chromatic aberration of magnification, and increase the field of view. As described above, the maximum number of fields of view of the scanning optical system SL indicates the diameter of the image surface I conjugate with the sample SA (the scanning surface of the sample SA), that is, the diameter of the imaging surface 13 (primary image surface) by the second objective lens 23.

If the corresponding value of the conditional expression (8) falls below the lower limit value, the maximum number of fields of view of the scanning optical system SL decreases. Accordingly, it is difficult to increase the field of view. By setting the lower limit value of the conditional expression (8) to 24 [mm], the advantageous effects of this embodiment can be more secured.

In the scanning optical system SL according to the third embodiment, at least one lens having the positive refractive power described above may satisfy the following conditional expression (4) described above.

$$\theta gF1-(-0.00168 \times vd1)-0.644>0.03 \tag{4}$$

The lens having the positive refractive power satisfies the conditional expression (4), which can favorably correct the chromatic aberration of magnification in the wavelength region of visible light, as with the first embodiment. Note that by setting the lower limit value of the conditional expression (4) to 0.04, the advantageous effects of this embodiment can be more secured.

In the scanning optical system SL according to the third embodiment, at least one lens having the negative refractive power described above may satisfy the following conditional expression (5) described above.

$$\theta gF2 - (-0.00168 \times vd2) - 0.644 < -0.002 \quad (5)$$

The lens having the negative refractive power satisfies the conditional expression (5), which can favorably correct the chromatic aberration of magnification in the wavelength region of visible light, as with the first embodiment. Note that by setting the upper limit value of the conditional expression (5) to −0.004, the advantageous effects of this embodiment can be more secured.

In the scanning optical system SL according to the third embodiment, at least one lens having the positive refractive power described above may satisfy the following conditional expression (6) described above.

$$\theta gF1 < 0.55 \quad (6)$$

The lens having the positive refractive power satisfies the conditional expression (6), which can favorably correct the chromatic aberration of magnification in the wavelength region of visible light, as with the first embodiment. Note that by setting the upper limit value of the conditional expression (6) to 0.535, the advantageous effects of this embodiment can be more secured.

In the scanning optical system SL according to the third embodiment, at least one lens having the negative refractive power described above may satisfy the following conditional expression (7) described above.

$$\theta gF2 > 0.56 \quad (7)$$

The lens having the negative refractive power satisfies the conditional expression (7), which can favorably correct the chromatic aberration of magnification in the wavelength region of visible light, as with the first embodiment. Note that by setting the lower limit value of the conditional expression (7) to 0.58, the advantageous effects of this embodiment can be more secured.

Next, a fourth embodiment of the scanning optical system is described. The scanning optical system according to the fourth embodiment has a configuration similar to that of the scanning optical system SL according to the first embodiment. Accordingly, the same symbols as those in the first embodiment are assigned and description is made. As with a scanning optical system SL(1) shown in FIG. 2, the scanning optical system SL according to the fourth embodiment comprises, for example: a first lens group G1 having a negative refractive power; a second lens group G2 having a positive refractive power; and a third lens group G3 having a negative refractive power, the lens groups being arranged sequentially from the side of the scanning mechanism 31 (pupil conjugate surface P). By arranging the first lens group G1 and the third lens group G3 that have the negative refractive powers before and after the second lens group G2 having the positive refractive power, the Petzval sum can be reduced close to zero, and the field curves can be favorably corrected.

The scanning optical system SL according to the fourth embodiment may be a scanning optical system SL(2) shown in FIG. 4, a scanning optical system SL(3) shown in FIG. 6, or a scanning optical system SL(4) shown in FIG. 8. The scanning optical system SL according to the fourth embodiment may be a scanning optical system SL(5) shown in FIG. 10, a scanning optical system SL(6) shown in FIG. 12, or a scanning optical system SL(7) shown in FIG. 14.

In the scanning optical system SL according to the fourth embodiment, at least one lens included in any of the first lens group G1, the second lens group G2 and the third lens group G3 has a positive refractive power, and satisfies the following conditional expression (4) described above.

$$\theta gF1 - (-0.00168 \times vd1) - 0.644 > 0.03 \quad (4)$$

The lens having the positive refractive power satisfies the conditional expression (4), which can favorably correct the chromatic aberration of magnification in the wavelength region of visible light, as with the first embodiment. Note that by setting the lower limit value of the conditional expression (4) to 0.04, the advantageous effects of this embodiment can be more secured.

In the scanning optical system SL according to the fourth embodiment, at least one lens included in any of the first lens group G1, the second lens group G2 and the third lens group G3 has a negative refractive power, and satisfies the following conditional expression (5) described above.

$$\theta gF2 - (-0.00168 \times vd2) - 0.644 < -0.002 \quad (5)$$

The lens having the negative refractive power satisfies the conditional expression (5), which can favorably correct the chromatic aberration of magnification in the wavelength region of visible light, as with the first embodiment. Note that by setting the upper limit value of the conditional expression (5) to −0.004, the advantageous effects of this embodiment can be more secured.

The scanning optical system SL according to the fourth embodiment satisfies the following conditional expression (8) described above.

$$FOV \geq 23 \, [mm] \quad (8)$$

By satisfying the conditional expression (8), the field of view can be increased, as with the first embodiment. According to the fourth embodiment, the conditional expressions (4), (5) and (8) are satisfied, which can reduce the chromatic aberration of magnification, and increase the field of view. Note that by setting the lower limit value of the conditional expression (8) to [mm], the advantageous effects of this embodiment can be more secured.

In the scanning optical system SL according to the fourth embodiment, at least one lens having the positive refractive power described above may satisfy the following conditional expression (1) described above.

$$vd1 > 80 \quad (1)$$

The lens having the positive refractive power satisfies the conditional expression (1), which can favorably correct the chromatic aberration of magnification, as with the first embodiment. Note that by setting the lower limit value of the conditional expression (1) to 90, the advantageous effects of this embodiment can be more secured.

In the scanning optical system SL according to the fourth embodiment, at least one lens having the negative refractive power described above may satisfy the following conditional expression (2) described above.

$$vd2 < 50 \quad (2)$$

The lens having the negative refractive power satisfies the conditional expression (2), which can favorably correct the chromatic aberration of magnification, as with the first embodiment. Note that by setting the upper limit value of the conditional expression (2) to 40, the advantageous effects of this embodiment can be more secured.

In the scanning optical system SL according to the fourth embodiment, at least one lens having the positive refractive power described above may satisfy the following conditional expression (6) described above.

$$\theta gF1 < 0.55 \quad (6)$$

The lens having the positive refractive power satisfies the conditional expression (6), which can favorably correct the chromatic aberration of magnification in the wavelength region of visible light, as with the first embodiment. Note that by setting the upper limit value of the conditional expression (6) to 0.535, the advantageous effects of this embodiment can be more secured.

In the scanning optical system SL according to the fourth embodiment, at least one lens having the negative refractive power described above may satisfy the following conditional expression (7) described above.

$$\theta gF2>0.56 \tag{7}$$

The lens having the negative refractive power satisfies the conditional expression (7), which can favorably correct the chromatic aberration of magnification in the wavelength region of visible light, as with the first embodiment. Note that by setting the lower limit value of the conditional expression (7) to 0.58, the advantageous effects of this embodiment can be more secured.

Next, a fifth embodiment of the scanning optical system is described. The scanning optical system according to the fifth embodiment has a configuration similar to that of the scanning optical system SL according to the first embodiment. Accordingly, the same symbols as those in the first embodiment are assigned and description is made. As with a scanning optical system SL(1) shown in FIG. 2, the scanning optical system SL according to the fifth embodiment comprises, for example: a first lens group G1 having a negative refractive power; a second lens group G2 having a positive refractive power; and a third lens group G3 having a negative refractive power, the lens groups being arranged sequentially from the side of the scanning mechanism 31 (pupil conjugate surface P). By arranging the first lens group G1 and the third lens group G3 that have the negative refractive powers before and after the second lens group G2 having the positive refractive power, the Petzval sum can be reduced close to zero, and the field curves can be favorably corrected.

The scanning optical system SL according to the fifth embodiment may be a scanning optical system SL(2) shown in FIG. 4, a scanning optical system SL(3) shown in FIG. 6, or a scanning optical system SL(4) shown in FIG. 8. The scanning optical system SL according to the fifth embodiment may be a scanning optical system SL(5) shown in FIG. 10, a scanning optical system SL(6) shown in FIG. 12, or a scanning optical system SL(7) shown in FIG. 14.

In the scanning optical system SL according to the fifth embodiment, at least one lens included in any of the first lens group G1, the second lens group G2 and the third lens group G3 has a positive refractive power, and satisfies the following conditional expression (1) described above.

$$vd1>80 \tag{1}$$

The lens having the positive refractive power satisfies the conditional expression (1), which can favorably correct the chromatic aberration of magnification, as with the first embodiment. Note that by setting the lower limit value of the conditional expression (1) to 90, the advantageous effects of this embodiment can be more secured.

In the scanning optical system SL according to the fifth embodiment, at least one lens included in any of the first lens group G1, the second lens group G2 and the third lens group G3 has a negative refractive power, and satisfies the following conditional expression (2) described above.

$$vd2<50 \tag{2}$$

The lens having the negative refractive power satisfies the conditional expression (2), which can favorably correct the chromatic aberration of magnification, as with the first embodiment. Note that by setting the upper limit value of the conditional expression (2) to 40, the advantageous effects of this embodiment can be more secured.

The scanning optical system SL according to the fifth embodiment satisfies the following conditional expression (9).

$$\Phi max \geq 48.0 \text{ [mm]} \tag{9}$$

where Φ max: the maximum outer diameter of the scanning optical system SL.

The conditional expression (9) defines the maximum outer diameter of the scanning optical system SL. The conditional expression (9) is satisfied, which can increase the maximum outer diameter of the scanning optical system SL, and increase the maximum number of fields of view of the scanning optical system SL accordingly, thereby allowing the field of view to be increased. According to the fifth embodiment, the conditional expressions (1), (2) and (9) are satisfied, which can reduce the chromatic aberration of magnification, and increase the field of view.

If the corresponding value of the conditional expression (9) falls below the lower limit value, the maximum outer diameter of the scanning optical system SL decreases, and the maximum number of fields of view of the scanning optical system SL decreases accordingly. It is difficult to increase the field of view. By setting the lower limit value of the conditional expression (9) to 48.5 [mm], the advantageous effects of this embodiment can be more secured.

In the scanning optical system SL according to the fifth embodiment, at least one lens having the positive refractive power described above may satisfy the following conditional expression (4) described above.

$$\theta gF1-(-0.00168 \times vd1)-0.644>0.03 \tag{4}$$

The lens having the positive refractive power satisfies the conditional expression (4), which can favorably correct the chromatic aberration of magnification in the wavelength region of visible light, as with the first embodiment. Note that by setting the lower limit value of the conditional expression (4) to 0.04, the advantageous effects of this embodiment can be more secured.

In the scanning optical system SL according to the fifth embodiment, at least one lens having the negative refractive power described above may satisfy the following conditional expression (5) described above.

$$\theta gF2-(-0.00168 \times vd2)-0.644<-0.002 \tag{5}$$

The lens having the negative refractive power satisfies the conditional expression (5), which can favorably correct the chromatic aberration of magnification in the wavelength region of visible light, as with the first embodiment. Note that by setting the upper limit value of the conditional expression (5) to −0.004, the advantageous effects of this embodiment can be more secured.

In the scanning optical system SL according to the fifth embodiment, at least one lens having the positive refractive power described above may satisfy the following conditional expression (6) described above.

$$\theta gF1<0.55 \tag{6}$$

The lens having the positive refractive power satisfies the conditional expression (6), which can favorably correct the chromatic aberration of magnification in the wavelength region of visible light, as with the first embodiment. Note that by setting the upper limit value of the conditional expression (6) to 0.535, the advantageous effects of this embodiment can be more secured.

In the scanning optical system SL according to the fifth embodiment, at least one lens having the negative refractive power described above may satisfy the following conditional expression (7) described above.

$$\theta gF2 > 0.56 \quad (7)$$

The lens having the negative refractive power satisfies the conditional expression (7), which can favorably correct the chromatic aberration of magnification in the wavelength region of visible light, as with the first embodiment. Note that by setting the lower limit value of the conditional expression (7) to 0.58, the advantageous effects of this embodiment can be more secured.

Next, a sixth embodiment of the scanning optical system is described. The scanning optical system according to the sixth embodiment has a configuration similar to that of the scanning optical system SL according to the first embodiment. Accordingly, the same symbols as those in the first embodiment are assigned and description is made. As with a scanning optical system SL(1) shown in FIG. 2, the scanning optical system SL according to the sixth embodiment comprises, for example: a first lens group G1 having a negative refractive power; a second lens group G2 having a positive refractive power; and a third lens group G3 having a negative refractive power, the lens groups being arranged sequentially from the side of the scanning mechanism 31 (pupil conjugate surface P). By arranging the first lens group G1 and the third lens group G3 that have the negative refractive powers before and after the second lens group G2 having the positive refractive power, the Petzval sum can be reduced close to zero, and the field curves can be favorably corrected.

The scanning optical system SL according to the sixth embodiment may be a scanning optical system SL(2) shown in FIG. 4, a scanning optical system SL(3) shown in FIG. 6, or a scanning optical system SL(4) shown in FIG. 8. The scanning optical system SL according to the sixth embodiment may be a scanning optical system SL(5) shown in FIG. 10, a scanning optical system SL(6) shown in FIG. 12, or a scanning optical system SL(7) shown in FIG. 14.

In the scanning optical system SL according to the sixth embodiment, at least one lens included in any of the first lens group G1, the second lens group G2 and the third lens group G3 has a positive refractive power, and satisfies the following conditional expression (4) described above.

$$\theta gF1 - (-0.00168 \times vd1) - 0.644 > 0.03 \quad (4)$$

The lens having the positive refractive power satisfies the conditional expression (4), which can favorably correct the chromatic aberration of magnification in the wavelength region of visible light, as with the first embodiment. Note that by setting the lower limit value of the conditional expression (4) to 0.04, the advantageous effects of this embodiment can be more secured.

In the scanning optical system SL according to the sixth embodiment, at least one lens included in any of the first lens group G1, the second lens group G2 and the third lens group G3 has a negative refractive power, and satisfies the following conditional expression (5) described above.

$$\theta gF2 - (-0.00168 \times vd2) - 0.644 < -0.002 \quad (5)$$

The lens having the negative refractive power satisfies the conditional expression (5), which can favorably correct the chromatic aberration of magnification in the wavelength region of visible light, as with the first embodiment. Note that by setting the upper limit value of the conditional expression (5) to −0.004, the advantageous effects of this embodiment can be more secured.

The scanning optical system SL according to the sixth embodiment satisfies the following conditional expression (9) described above.

$$\Phi \max \geq 48.0 \text{ [mm]} \quad (9)$$

By satisfying the conditional expression (9), the field of view can be increased, as with the first embodiment. According to the sixth embodiment, the conditional expressions (4), (5) and (9) are satisfied, which can reduce the chromatic aberration of magnification, and increase the field of view. Note that by setting the lower limit value of the conditional expression (9) to 48.5 [mm], the advantageous effects of this embodiment can be more secured.

In the scanning optical system SL according to the sixth embodiment, at least one lens having the positive refractive power described above may satisfy the following conditional expression (1) described above.

$$vd1 > 80 \quad (1)$$

The lens having the positive refractive power satisfies the conditional expression (1), which can favorably correct the chromatic aberration of magnification, as with the first embodiment. Note that by setting the lower limit value of the conditional expression (1) to 90, the advantageous effects of this embodiment can be more secured.

In the scanning optical system SL according to the sixth embodiment, at least one lens having the negative refractive power described above may satisfy the following conditional expression (2) described above.

$$vd2 < 50 \quad (2)$$

The lens having the negative refractive power satisfies the conditional expression (2), which can favorably correct the chromatic aberration of magnification, as with the first embodiment. Note that by setting the upper limit value of the conditional expression (2) to 40, the advantageous effects of this embodiment can be more secured.

In the scanning optical system SL according to the sixth embodiment, at least one lens having the positive refractive power described above may satisfy the following conditional expression (6) described above.

$$\theta gF1 < 0.55 \quad (6)$$

The lens having the positive refractive power satisfies the conditional expression (6), which can favorably correct the chromatic aberration of magnification in the wavelength region of visible light, as with the first embodiment. Note that by setting the upper limit value of the conditional expression (6) to 0.535, the advantageous effects of this embodiment can be more secured.

In the scanning optical system SL according to the sixth embodiment, at least one lens having the negative refractive power described above may satisfy the following conditional expression (7) described above.

$$\theta gF2 > 0.56 \quad (7)$$

The lens having the negative refractive power satisfies the conditional expression (7), which can favorably correct the chromatic aberration of magnification in the wavelength region of visible light, as with the first embodiment. Note that by setting the lower limit value of the conditional expression (7) to 0.58, the advantageous effects of this embodiment can be more secured.

The scanning optical systems SL according to the first to sixth embodiments may satisfy the following conditional expression (10).

$$0.35 < FOV/Fh < 0.55 \tag{10}$$

where FOV: the maximum number of fields of view of the scanning optical system SL.

Fh: the focal length of the scanning optical system SL.

The conditional expression (10) defines the relationship between the maximum number of fields of view of the scanning optical system SL and the focal length of the scanning optical system SL. By satisfying the conditional expression (10), the size of the scanning mechanism 31 is appropriately maintained, and the scanning speed is maintained while the maximum number of fields of view of the scanning optical system SL is increased, thereby allowing a wide field of view on the sample SA to be achieved.

If the corresponding value of the conditional expression (10) falls below the lower limit value, the focal length of the scanning optical system SL increases, and the numerical aperture of the scanning optical system SL decreases. As a result, in order to secure the luminance, the diameter of the pupil where the scanning mechanism 31 is arranged is required to increase, which in turn increases the size of the scanning mechanism 31. By setting the lower limit value of the conditional expression (10) to 0.40, the advantageous effects of this embodiment can be more secured.

If the corresponding value of the conditional expression (10) exceeds the upper limit value, the focal length of the scanning optical system SL decreases, and the deflection angle of laser light by the scanning mechanism 31 is required to be large. As a result, the speed of scanning the sample SA with the laser light by the scanning mechanism 31 decreases. If the focal length of the scanning optical system SL decreases, the imaging performances, such as of field curves and chromatic aberration of magnification, decrease at the peripheral part of the field of view. By setting the upper limit value of the conditional expression (10) to 0.50, the advantageous effects of this embodiment can be more secured.

In each of the scanning optical systems SL according to the first to sixth embodiments, at least one lens having the positive refractive power described above may satisfy the following conditional expression (11).

$$\theta Ct1 - (0.0048 \times vd1) - 0.542 < -0.05 \tag{11}$$

where $\theta Ct1$: a partial dispersion ratio of the lens having the positive refractive power, defined by the following expression, $$\theta Ct1 = (nC1 - nt1)/(nF1 - nC1),$$

wherein a refractive index of the lens having the positive refractive power for C-line is nC1, a refractive index of the lens having the positive refractive power for t-line is nt1, and a refractive index of the lens having the positive refractive power for F-line is nF1.

The conditional expression (11) defines the relationship between the partial dispersion ratio and the Abbe number of the material of the lens having the positive refractive power. The lens having the positive refractive power satisfies the conditional expression (11), which can favorably correct the chromatic aberration of magnification in the wavelength region of visible light and a wavelength region of infrared light (for example, a wavelength region up to about 1000 nm), using the anomalous dispersion characteristics of the material of the lens having the positive refractive power. Accordingly, even in a scanning-type confocal microscope that uses excitation light in a wavelength region ranging from about 700 nm to 1000 nm and supports fluorescent observation with multiphoton excitation, the chromatic aberration of magnification can be favorably corrected.

If the corresponding value of the conditional expression (11) exceeds the upper limit value, the effect of the anomalous dispersion characteristics becomes insufficient. Accordingly, it is difficult to correct the chromatic aberration of magnification. By setting the upper limit value of the conditional expression (11) to −0.10, the advantageous effects of this embodiment can be more secured.

In each of the scanning optical systems SL according to the first to sixth embodiments, at least one lens having the negative refractive power described above may satisfy the following conditional expression (12).

$$\theta Ct2 - (0.0048 \times vd2) - 0.542 > 0.01 \tag{12}$$

where $\theta Ct2$: a partial dispersion ratio of the lens having the negative refractive power, defined by the following expression, $$\theta Ct2 = (nC2 - nt2)/(nF2 - nC2),$$

wherein a refractive index of the lens having the negative refractive power for C-line is nC2, a refractive index of the lens having the negative refractive power for t-line is nt2, and a refractive index of the lens having the negative refractive power for F-line is nF2.

The conditional expression (12) defines the relationship between the partial dispersion ratio and the Abbe number of the material of the lens having the negative refractive power. The lens having the negative refractive power satisfies the conditional expression (12), which can favorably correct the chromatic aberration of magnification in the wavelength region of visible light and a wavelength region of infrared light (for example, a wavelength region up to about 1000 nm), using the anomalous dispersion characteristics of the material of the lens having the negative refractive power. Accordingly, even in a scanning-type confocal microscope that uses excitation light in a wavelength region ranging from about 700 nm to 1000 nm and supports fluorescent observation with multiphoton excitation, the chromatic aberration of magnification can be favorably corrected.

If the corresponding value of the conditional expression (12) falls below the lower limit value, the effect of the anomalous dispersion characteristics becomes insufficient. Accordingly, it is difficult to correct the chromatic aberration of magnification. By setting the lower limit value of the conditional expression (12) to 0.015, the advantageous effects of this embodiment can be more secured.

In each of the scanning optical systems SL according to the first to sixth embodiments, at least one lens having the positive refractive power described above may satisfy the following conditional expression (13).

$$\theta Ct1 > 0.79 \tag{13}$$

The conditional expression (13) defines the partial dispersion ratio of the material of the lens having the positive refractive power. The lens having the positive refractive power satisfies the conditional expression (13), which can make the anomalous dispersion characteristics of the material of the lens having the positive refractive power appropriate, and favorably correct the chromatic aberration of magnification in the wavelength region of visible light and a wavelength region of infrared light (for example, a wavelength region up to about 1000 nm).

If the corresponding value of the conditional expression (13) falls below the lower limit value, the anomalous dispersion characteristics of the material of the lens having the positive refractive power become excessive. Accordingly, it is difficult to correct the chromatic aberration of magnification. By setting the lower limit value of the conditional expression (13) to 0.82, the advantageous effects of this embodiment can be more secured.

In each of the scanning optical systems SL according to the first to sixth embodiments, at least one lens having the negative refractive power described above may satisfy the following conditional expression (14).

$$\theta Ct2 < 0.8 \tag{14}$$

The conditional expression (14) defines the partial dispersion ratio of the material of the lens having the negative refractive power. The lens having the negative refractive power satisfies the conditional expression (14), which can make the anomalous dispersion characteristics of the material of the lens having the negative refractive power appropriate, and favorably correct the chromatic aberration of magnification in the wavelength region of visible light and a wavelength region of infrared light (for example, a wavelength region up to about 1000 nm).

If the corresponding value of the conditional expression (14) exceeds the upper limit value, the anomalous dispersion characteristics of the material of the lens having the negative refractive power become excessive. Accordingly, it is difficult to correct the chromatic aberration of magnification. By setting the upper limit value of the conditional expression (14) to 0.75, the advantageous effects of this embodiment can be more secured.

The scanning optical systems SL according to the first to sixth embodiments may satisfy following conditional expressions (15) to (17).

$$1.5 < (-Fh1)/Fh < 5.0 \tag{15}$$

$$0.6 < Fh2/Fh < 0.9 \tag{16}$$

$$0.8 < (-Fh3)/Fh < 1.3 \tag{17}$$

where
Fh1: the focal length of the first lens group G1,
Fh2: the focal length of the second lens group G2,
Fh3: the focal length of the third lens group G3, and
Fh: the focal length of the scanning optical system SL.

The conditional expression (15) defines the power (refractive power) of the first lens group G1. The conditional expression (16) defines the power (refractive power) of the second lens group G2. The conditional expression (17) defines the power (refractive power) of the third lens group G3. By satisfying the conditional expressions (15) to (17), the distance between the scanning mechanism 31 and the scanning optical system SL, and the distance between the scanning optical system SL and the imaging surface 13 (primary image surface) by the second objective lens 23 can be maintained to be appropriate distances. The Petzval sum can be reduced close to zero, and the field curves can be favorably corrected accordingly.

If the corresponding value of the conditional expression (15) falls below the lower limit value, the negative power of the first lens group G1 becomes excessive, and the Petzval sum becomes negatively strong accordingly. It is difficult to correct the field curves. By setting the lower limit value of the conditional expression (15) to 1.7, the advantageous effects of this embodiment can be more secured.

If the corresponding value of the conditional expression (15) exceeds the upper limit value, the negative power of the first lens group G1 becomes insufficient, and the Petzval sum becomes positively large accordingly. It is difficult to correct the field curves. By setting the upper limit value of the conditional expression (15) to 4.6, the advantageous effects of this embodiment can be more secured.

If the corresponding value of the conditional expression (16) falls below the lower limit value, the positive power of the second lens group G2 becomes excessive. Accordingly, it is difficult to correct off-axis aberrations, in particular, the coma aberration and the chromatic aberration of magnification. The Petzval sum becomes positively large, and it is difficult to correct the field curves. By setting the lower limit value of the conditional expression (16) to 0.65, the advantageous effects of this embodiment can be more secured.

If the corresponding value of the conditional expression (16) exceeds the upper limit value, the positive power of the second lens group G2 becomes insufficient, and the Petzval sum becomes negatively strong accordingly. It is difficult to correct the field curves. By setting the upper limit value of the conditional expression (16) to 0.85, the advantageous effects of this embodiment can be more secured.

If the corresponding value of the conditional expression (17) falls below the lower limit value, the negative power of the third lens group G3 becomes excessive, and the Petzval sum becomes negatively strong accordingly. It is difficult to correct the field curves. The distance (back focus) between the scanning optical system SL and the primary image surface 13 becomes small. Accordingly, an image of dust or the like on a lens surface on the primary image surface side tends to be taken. By setting the lower limit value of the conditional expression (17) to 0.85, the advantageous effects of this embodiment can be more secured.

If the corresponding value of the conditional expression (17) exceeds the upper limit value, the negative power of the third lens group G3 becomes insufficient, and the Petzval sum becomes positively large accordingly. It is difficult to correct the field curves. By setting the upper limit value of the conditional expression (17) to 1.2, the advantageous effects of this embodiment can be more secured.

In each of the scanning optical systems SL according to the first to sixth embodiments, the lens surface that is closer to the scanning mechanism 31 and is of the lens of the first lens group G1 arranged closest to the scanning mechanism 31 may be a concave surface, and the lens surface that is closer to the objective lens 24 and is of the lens of the third lens group G3 arranged closest to the objective lens 24 may be a concave surface. Accordingly, the off-axis aberrations, in particular, field curves, can be favorably corrected.

In each of the scanning optical systems SL according to the first to sixth embodiments, the second lens group G2 may include the lens having the positive refractive power described above. Accordingly, the longitudinal chromatic aberration and the chromatic aberration of magnification can be favorably corrected.

In each of the scanning optical systems SL according to the first to sixth embodiments, the second lens group G2 may include at least one cemented lens. Accordingly, the longitudinal chromatic aberration and the chromatic aberration of magnification can be favorably corrected.

In each of the scanning optical systems SL according to the first to sixth embodiments, the cemented lens (of the second lens group G2) may include the lens having the positive refractive power described above. Accordingly, the longitudinal chromatic aberration and the chromatic aberration of magnification can be favorably corrected.

In each of the scanning optical systems SL according to the first to sixth embodiments, the third lens group G3 may include a first cemented lens and a second cemented lens arranged sequentially from the side of the scanning mechanism 31. Accordingly, the longitudinal chromatic aberration and the chromatic aberration of magnification can be favorably corrected.

The scanning optical systems SL according to the first to sixth embodiments may satisfy the following conditional expression (18).

$$vd3 < vd4 \tag{18}$$

where vd3: an Abbe number with reference to d-line of a positive lens included in the first cemented lens, defined by the following expression, assuming that a refractive index of the positive lens for d-line is nd3, a refractive index of the positive lens for F-line is nF3, and a refractive index of the positive lens for C-line is nC3, $$vd3=(nd3-1)/(nF3-nC3)$$

where vd4: an Abbe number with reference to d-line of a negative lens included in the first cemented lens, defined by the following expression, $$vd4=(nd4-1)/(nF4-nC4),$$

wherein a refractive index of the negative lens for d-line is nd4, a refractive index of the negative lens for F-line is nF4, and a refractive index of the negative lens for C-line is nC4.

The conditional expression (18) defines the relationship between the Abbe number with reference to d-line of the positive lens included in the first cemented lens, and the Abbe number with reference to d-line of the negative lens included in the first cemented lens. By arranging the cemented lens intentionally causing chromatic aberrations at a predetermined position, the chromatic aberrations can be corrected over a wide wavelength region. In each of the scanning optical systems SL according to the first to sixth embodiments, chromatic aberrations can be intentionally caused at the first cemented lens between the two cemented lenses in the third lens group G3. The first cemented lens intentionally causing the chromatic aberrations satisfies the conditional expression (18), which allows correction of the chromatic aberrations over a wide wavelength region and, in particular, correction of the chromatic aberration of magnification, to be favorably performed.

In each of the scanning optical systems SL according to the first to sixth embodiments, the first lens group G1 may include at least one cemented lens or a single lens. The third lens group G3 may include two cemented lenses. Note that the second lens group G2 may be arranged between the first lens group G1 and the third lens group G3.

The scanning optical systems SL according to the first to sixth embodiments may satisfy the following conditional expression (19).

$$(FOV/Fh) \times (NAob \times Fob) > 3.1 \text{ [mm]} \tag{19}$$

where FOV: the maximum number of fields of view of the scanning optical system SL.
Fh: the focal length of the scanning optical system SL.
NAob: a numerical aperture of the objective lens 24, and
Fob: a focal length of the objective lens 24.

The conditional expression (19) defines the relationship between the maximum number of fields of view and the focal length of the scanning optical system SL, and the numerical aperture and the focal length of the objective lens 24. When it is assumed that Wh=FOV/Fh and Pob=NAob×Fob, the conditional expression (19) can be represented as the following expression (19-1).

$$Wh \times Pob > 3.1 \text{ [mm]} \tag{19-1}$$

where it is assumed that the focal length of the lens is f, the maximum image height is y, the half angle of view is ω, the numerical aperture is NA, and the pupil diameter is φ. Typically, the relationship between the focal length f and the maximum image height y of the lens is y=f×tan ω. The relationship in a case where the lens (focal length f) is replaced with the scanning optical system SL (Focal length Fh), y=Fh×tan ω. The relationship between the maximum number of fields of view FOV and the maximum image height y is FOV=2×y. Consequently, Wh can be represented as the following expression (19-1A).

$$Wh = FOV/Fh = (2 \times y)/(y/\tan\omega) = 2 \times \tan\omega \tag{19-1A}$$

As shown in the expression (19-1A), Wh substantially means the angle of view at the maximum number of fields of view of the scanning optical system SL. The relationship between the focal length f and the numerical aperture NA of the lens is φ=2×f×NA. The relationship described above in a case where the lens (the focal length f and the numerical aperture NA) is replaced with the objective lens 24 (the focal length Fob and the numerical aperture NAob) is φ=2×Fob×NAob. Consequently, Pob can be represented as the following expression (19-1B).

$$Pob = NAob \times Fob = (2 \times Fob \times NAob)/2 = \phi/2 \tag{19-1B}$$

As shown in the expression (19-1B), Pob substantially means half a pupil diameter of the objective lens 24. That is, in the conditional expression (19-1), Wh corresponds to the angle of view at the maximum number of fields of view of the scanning optical system SL, and Pob corresponds to the pupil diameter of the objective lens 24. Accordingly, by satisfying the conditional expression (19-1), that is, the conditional expression (19), the pupil diameter of the objective lens 24 can be sufficiently secured with respect to the maximum number of fields of view of the scanning optical system SL, and a wide field of view and high resolution on the sample SA can be secured.

If the corresponding value of the conditional expression (19) falls below the lower limit value, the pupil diameter of the objective lens 24 cannot be sufficiently secured even with the maximum number of fields of view of the scanning optical system SL being increased to increase the field of view of the scanning optical system SL; it is difficult to observe the sample SA with a sufficient resolution. The focal length of the scanning optical system SL increases. Accordingly, the numerical aperture of the scanning optical system SL decreases. As a result, the diameter of the laser light (the beam diameter of excitation light) incident on the objective lens 24 decreases. It is difficult to observe the sample SA with a sufficient resolution. By setting the lower limit value of the conditional expression (19) to 4.0 [mm], the advantageous effects of this embodiment can be more secured.

The scanning optical systems SL according to the first to sixth embodiments may satisfy the following conditional expression (20).

$$\Phi b \times \theta b > 63 \text{ [mm} \times \text{degrees]} \tag{20}$$

where Φb: the diameter of laser light (the beam diameter of excitation light) incident from the scanning mechanism 31 onto the scanning optical system SL, and θb: a maximum angle between the optical axis and the laser light incident from the scanning mechanism 31 onto the scanning optical system SL.

The conditional expression (20) defines the relationship between the diameter of the laser light (e.g., the diameter of laser light reflected by a galvanometer mirror of the scanning mechanism 31) incident on the scanning optical system SL from the scanning mechanism 31, and the maximum angle (e.g., the maximum angle of laser light inclined from the optical axis by the galvanometer mirror of the scanning mechanism 31 between the optical axis and the laser light incident on the scanning optical system SL from the scanning mechanism 31. By satisfying the conditional expression (20), a high resolution for the sample SA can be secured even with the field of view being increased.

If the corresponding value of the conditional expression (20) falls below the lower limit value, a sufficient diameter of laser light (the beam diameter of excitation light) cannot be achieved even with the maximum number of fields of view of the scanning optical system SL being increased to increase the field of view of the scanning optical system SL, making it difficult to achieve a sufficient resolution for the sample SA. If a sufficient resolution for the sample SA is intended to be secured, it is difficult to increase the field of view. By setting the lower limit value of the conditional expression (20) to 70 [mm×degrees], the advantageous effects of this embodiment can be more secured.

EXAMPLES

Hereinafter, scanning optical systems SL according to examples of the first to sixth embodiments are described with reference to the drawings. FIGS. 2, 4, 6, 8, 10, 12 and 14 are sectional views showing configurations and refractive power distributions of the scanning optical systems SL {SL(1) to SL(7)} according to first to seventh examples. In these FIGS. 2, 4, 6, 8, 10, 12 and 14, each lens group is represented by a combinations of a symbol G and a numeral, and each lens is represented by a combination of a symbol L and a numeral. In this case, to prevent the types and numbers of symbols and numerals from being large and complicated, the lens groups and the like are represented using combinations of symbols and numerals independently in each of the examples. Accordingly, even if the same combinations of symbols and numerals are used among the examples, the usage does not mean the same configurations.

Hereinafter, Tables 1 to 7 are shown. Among them, Table 1 is a table showing each data item in the first example, Table 2 is that in the second example, Table 3 is that in the third example, Table 4 is that in the fourth example, Table 5 is that in the fifth example, Table 6 is that in the sixth example, and Table is that in the seventh example. In each example, d-line (wavelength λ=587.56 nm), g-line (wavelength λ=435.84 nm), and t-line (wavelength λ=1013.98 nm) are selected as calculation targets of aberration characteristics.

The table of [General Data], Fh indicates the focal length of the entire scanning optical system. FOV indicates the maximum number of fields of view of the scanning optical system. NAob indicates the numerical aperture of the objective lens. Fob indicates the focal length of the objective lens. Φb indicates the diameter of laser light incident from the scanning mechanism onto the scanning optical system. θb indicates the maximum angle between the optical axis and the laser light incident from the scanning mechanism onto the scanning optical system.

In the table of [Lens Data], the surface number indicates the order of optical surfaces from the side of the pupil conjugate surface (scanning mechanism) along the ray traveling direction. R indicates the radius of curvature of each optical surface (the surface where the center of curvature is positioned on the image surface side is assumed to have a positive value). D indicates the distance to the next optical surface on the optical axis; the distance is a distance from each optical surface to the next optical surface (or image surface). νd indicates the Abbe number with reference to d-line of the material of the optical member. nd indicates the refractive index of the material of the optical member for d-line. θgF and θCt indicate the partial dispersion ratios of the material of the optical member. The radius of curvature of "∞" indicates a plane or an aperture. The description of the refractive index nd=1.000000 of air is omitted.

The refractive index of the material of the optical member for C-line (wavelength λ=656.27 nm) is assumed as nC. The refractive index of the material of the optical member for d-line (wavelength λ=587.56 nm) is assumed as nd. The refractive index of the material of the optical member for F-line (wavelength λ=486.13 nm) is assumed as nF. The refractive index of the material of the optical member for g-line (wavelength λ=435.84 nm) is assumed as ng. The refractive index of the material of the optical member for t-line (wavelength λ=1013.98 nm) is assumed as nt.

Here, the Abbe number νd with reference to d-line of the material of the optical member is defined by the following expression (A).

$$\nu d = (nd-1)/(nF-nC) \tag{A}$$

Here, the partial dispersion ratio θgF of the material of the optical member is defined by the following expression (B).

$$\theta gF = (ng-nF)/(nF-nC) \tag{B}$$

Here, the partial dispersion ratio θCt of the material of the optical member is defined by the following expression (C).

$$\theta Ct = (nC-nt)/(nF-nC) \tag{C}$$

The table of [Lens Group Data] shows the first surface (the surface closest to the scanning mechanism) of each lens group and the focal length.

The table of [Conditional Expression Corresponding Value] shows the value corresponding to each conditional expression.

Hereinafter, among all the data values, "mm" is generally used for the listed focal length Fh, radius of curvature R, distance D to the next lens surface, other lengths and the like if not otherwise specified. However, there is no limitation thereto, because the optical system can achieve equivalent optical performances even if being proportionally enlarged or reduced.

The description of the table so far is common to all the examples. Hereinafter, redundant description is omitted.

First Example

Figure 2:
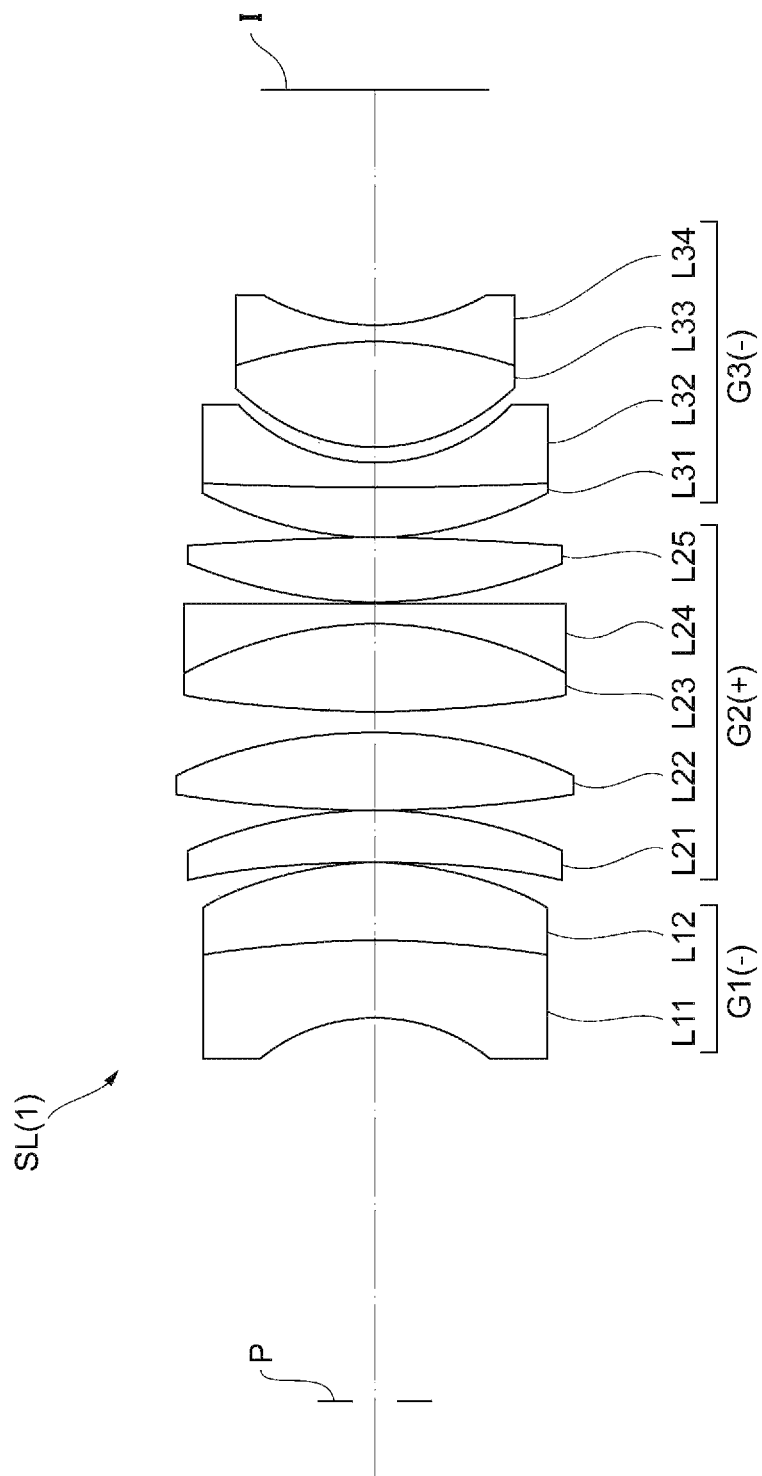
FIG. 2 is a lens configuration diagram of a scanning optical system according to a first example.

The first example is described with reference to FIGS. 2 and 3 and Table 1. FIG. 2 shows a lens configuration of a scanning optical system according to the first example of the first to sixth embodiments. A scanning optical system SL(1) according to the first example comprises: a first lens group G1 having a negative refractive power; a second lens group G2 having a positive refractive power; and a third lens group G3 having a negative refractive power, the lens groups being arranged sequentially from the side of the pupil conjugate surface P. Note that at a neighborhood of the pupil conjugate surface P, the scanning mechanism 31 (galvanometer mirror or the like) described above is arranged. The image surface I corresponds to the imaging surface 13 described above. A sign (+) or (−) assigned to each lens group symbol indicates the refractive power of each lens group. This also applies to all the examples described below.

The first lens group G1 comprises a cemented lens of a negative meniscus lens L11 with a concave surface facing the side of the pupil conjugate surface P, and a positive meniscus lens L12 with a concave surface facing the side of the pupil conjugate surface P. The second lens group G2 comprises: a positive meniscus lens L21 with a concave surface facing the side of the pupil conjugate surface P; a biconvex positive lens L22; a cemented lens of a biconvex positive lens L23 and a plano-concave negative lens L24; and a biconvex positive lens L25, the lenses being arranged sequentially from the side of the pupil conjugate surface P. The third lens group G3 comprises: a first cemented lens of a positive meniscus lens L31 with a convex surface facing the side of the pupil conjugate surface P, and a negative meniscus lens L32 with a convex surface facing the side of the pupil conjugate surface P; and a second cemented lens of a biconvex positive lens L33, and a biconcave negative lens L34, the lenses being arranged sequentially from the side of the pupil conjugate surface P. An image surface I is arranged on the third lens group G3 on the side toward the objective lens.

The following Table 1 lists values of data on the scanning optical system according to the first example.

TABLE 1

[General Data]
Fh = 60
FOV = 25
NAob = 1
Fob = 10
Φb = 6
θb = 11.8

[Lens Data]

| Surface Number | R | D | vd | nd | θgF | θCt |
|---|---|---|---|---|---|---|
| 1 | ∞ | 49.6000 | | | | |
| 2 | −24.9930 | 10.0000 | 64.14 | 1.516800 | 0.5357 | 0.8647 |
| 3 | −139.9370 | 10.0000 | 82.57 | 1.497820 | 0.5386 | 0.8175 |
| 4 | −48.4330 | 0.2000 | | | | |
| 5 | −133.2080 | 6.5500 | 70.31 | 1.487490 | 0.5291 | 0.8982 |
| 6 | −63.1220 | 0.2000 | | | | |
| 7 | 183.8690 | 10.0000 | 82.57 | 1.497820 | 0.5386 | 0.8175 |
| 8 | −65.4640 | 2.7000 | | | | |
| 9 | 162.0030 | 11.3000 | 91.36 | 1.456000 | 0.5342 | 0.8399 |
| 10 | −53.8120 | 2.7000 | 34.70 | 1.720467 | 0.5834 | 0.7267 |
| 11 | ∞ | 0.2000 | | | | |
| 12 | 67.2210 | 8.1500 | 67.90 | 1.593190 | 0.5440 | 0.7962 |
| 13 | −349.4370 | 0.2000 | | | | |
| 14 | 49.8630 | 6.3000 | 22.80 | 1.808095 | 0.6307 | 0.6596 |
| 15 | 400.6380 | 3.2500 | 32.30 | 1.738000 | 0.5900 | 0.7154 |
| 16 | 25.8310 | 2.0000 | | | | |
| 17 | 26.0490 | 13.6500 | 91.36 | 1.456000 | 0.5342 | 0.8399 |
| 18 | −57.1400 | 2.2500 | 60.20 | 1.640000 | 0.5377 | 0.8593 |
| 19 | 31.7990 | 30.2711 | | | | |

[Lens Group Data]

| Group | First surface | Focal length |
|---|---|---|
| G1 | 2 | −134.490 |
| G2 | 5 | 47.642 |
| G3 | 14 | −71.221 |

TABLE 1-continued

[Conditional Expression Corresponding Value]
Conditional Expression (1)
[positive meniscus lens L12] vd1 = 82.57
[positive lensL22] vd1 = 82.57
[positive lensL23] vd1 = 91.36
[positive lensL33] vd1 = 91.36
Conditional Expression (2)
[negative lens L24] vd2 = 34.70
Conditional Expression (3) hmax = 18.34
Conditional Expression (4)
[positive meniscus lens L12]
θgF1−(−0.00168 × vd1) −0.644 = 0.0333
[positive lensL22]
θgF1−(−0.00168 × vd1) −0.644 = 0.0333
[positive lens L23]
θgF1−(−0.00168 × vd1) −0.644 = 0.0437
[positive lens L33]
θgF1−(−0.00168 × vd1) −0.644 = 0.0437
Conditional Expression (5)
[negative lens L24]
θgF2−(−0.00168 × vd2) −0.644 = −0.0023
Conditional Expression (6)
[positive meniscus lens L12] θgF1 = 0.5386
[positive lens L22] θgF1 = 0.5386
[positive lens L23] θgF1−0.5342
[positive lens L33] θgF1 = 0.5342
Conditional Expression (7)
[negative lens L24] θgF2 = 0.5834
Conditional Expression (8) FOV = 25
Conditional Expression (9) Φmax = 50.0
Conditional Expression (10) FOV/Fh = 0.4167
Conditional Expression (11)
[positive meniscus lens L12]
θCt1−(0.0048 × vd1) −0.542 = −0.1208
[positive lens L22]
θct1−(0.0048 × vd1) −0.542 = −0.1208
[positive lens L23]
θCt1−(0.0048 × vd1) −0.542 = −0.1406
[positive lens L33]
θCt1−(0.0048 × vd1) −0.542 = −0.1406
Conditional Expression (12)
[negative lens L24]
θCt2−(0.0048 × vd2) −0.542 = 0.0181
Conditional Expression (13)
[positive meniscus lens L12] θCt1 = 0.8175
[positive lens L22] θCt1 = 0.8175
[positive lens L23] θCt1−0.8399
[positive lens L33] θCt1−0.8399
Conditional Expression (14)
[negative lens L24] θCt2−0.7267
Conditional Expression (15) (−Fh1)/Fh = 2.241
Conditional Expression (16) Fh2/Fh = 0.794
Conditional Expression (17) (−Fh3)/Fh = 1.187
Conditional Expression (18) vd3 = 22.80
vd4 = 32.30
Conditional Expression (19) (FOV/Fh) × (NAob × Fob) = 4.17
Conditional Expression (20) Φb × θb = 70.8

Figure 3:
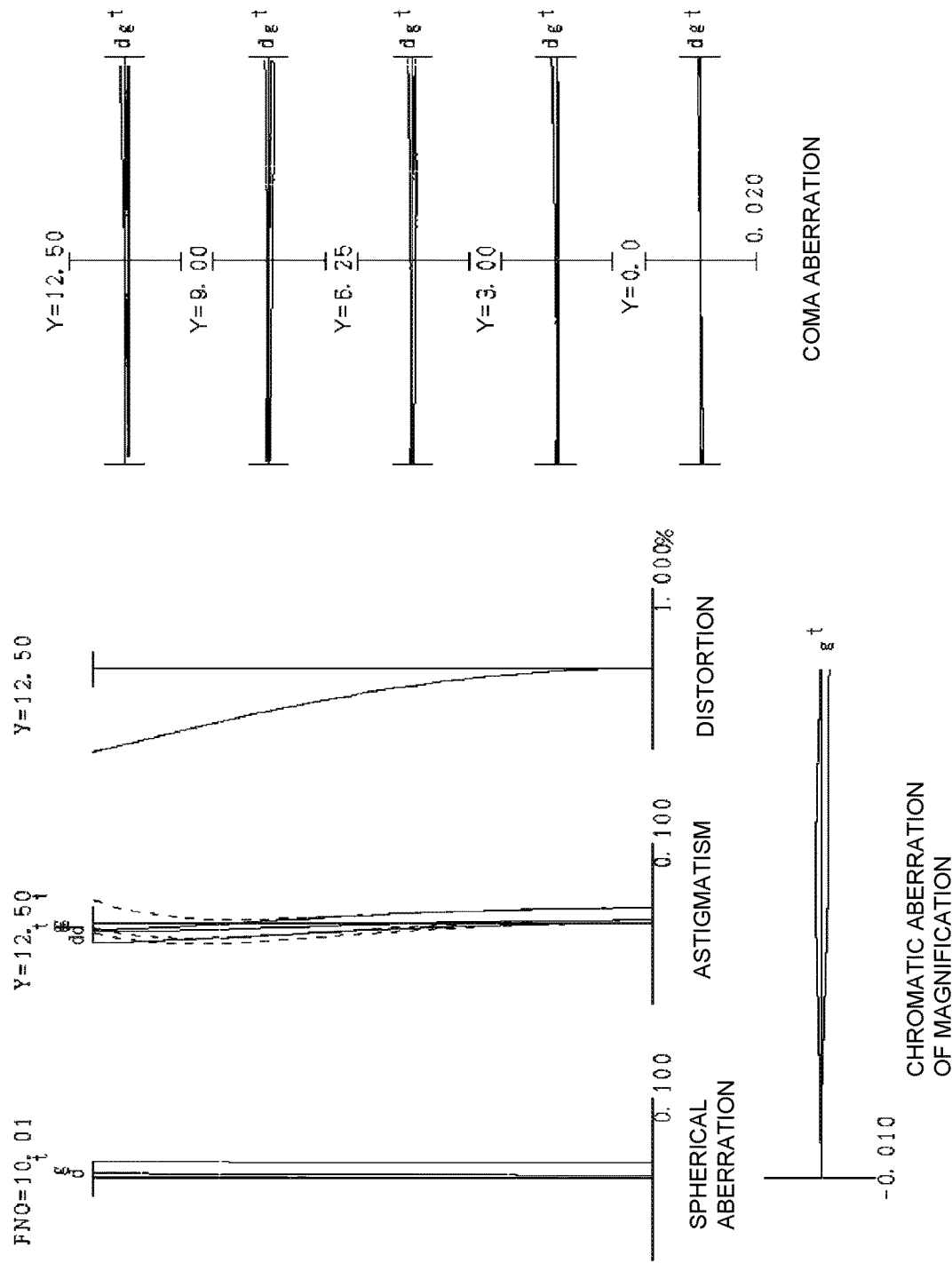
FIG. 3 shows various aberration graphs of the scanning optical system according to the first example.

FIG. 3 shows various aberration graphs of the scanning optical system according to the first example. In each aberration graph, FNO indicates the F-number, and Y indicates the image height. Note that the spherical aberration graph indicates the value of the F-number corresponding to the maximum diameter. The astigmatism graph and the distortion graph indicate the maximum value of the image height. The coma aberration graph indicates each image height. d indicates d-line (wavelength λ=587.56 nm), g indicates g-line (wavelength λ=435.84 nm), and t indicates t-line (wavelength λ=1013.98 nm). In the astigmatism graph, a solid line indicates a sagittal image surface, and a broken line indicates a meridional image surface. Note that also in the aberration graph in each example described below, symbols similar to those in this example are used, and redundant description is omitted.

Each aberration graph shows that in the scanning optical system according to the first example, various aberrations, such as the chromatic aberration of magnification, are favorably corrected in the wide wavelength region ranging from g-line to t-line, and the system has an excellent imaging performance.

Second Example

The second example is described with reference to FIGS. 4 and 5 and Table 2. FIG. 4 shows a lens configuration of a scanning optical system according to the second example of the first to sixth embodiments. A scanning optical system SL(2) according to the second example comprises: a first lens group G1 having a negative refractive power; a second lens group G2 having a positive refractive power; and a third lens group G3 having a negative refractive power, the lens groups being arranged sequentially from the side of the pupil conjugate surface P.

The first lens group G1 comprises a cemented lens of a negative meniscus lens L11 with a concave surface facing the side of the pupil conjugate surface P, and a positive meniscus lens L12 with a concave surface facing the side of the pupil conjugate surface P. The second lens group G2 comprises: a biconvex positive lens L21; a cemented lens of a biconvex positive lens L22 and a plano-concave negative lens L23; and a positive meniscus lens L24 with a convex surface facing the side of the pupil conjugate surface P, the lenses being arranged sequentially from the side of the pupil conjugate surface P. The third lens group G3 comprises: a first cemented lens of a positive meniscus lens L31 with a convex surface facing the side of the pupil conjugate surface P, and a negative meniscus lens L32 with a convex surface facing the side of the pupil conjugate surface P; and a second cemented lens of a biconvex positive lens L33, and a biconcave negative lens L34, the lenses being arranged sequentially from the side of the pupil conjugate surface P. An image surface I is arranged on the third lens group G3 on the side toward the objective lens.

The following Table 2 lists values of data on the scanning optical system according to the second example.

TABLE 2

[General Data]

Fh = 60
FOV = 25
NAob = 1
Fob = 10
Φb = 6
θb = 11.8

[Lens Data]

| Surface Number | R | D | νd | nd | θgF | θCt |
|---|---|---|---|---|---|---|
| 1 | ∞ | 53.5500 | | | | |
| 2 | −23.8529 | 12.0000 | 64.14 | 1.516800 | 0.5357 | 0.8647 |
| 3 | −77.8908 | 8.0000 | 82.57 | 1.497820 | 0.5386 | 0.8175 |
| 4 | −36.0676 | 3.5000 | | | | |
| 5 | 141.3954 | 9.5000 | 82.57 | 1.497820 | 0.5386 | 0.8175 |
| 6 | −65.6628 | 2.0000 | | | | |
| 7 | 117.4037 | 10.5000 | 91.36 | 1.456000 | 0.5342 | 0.8399 |
| 8 | −56.5472 | 2.5000 | 34.70 | 1.720467 | 0.5834 | 0.7267 |
| 9 | ∞ | 0.2000 | | | | |
| 10 | 53.4466 | 8.0000 | 67.90 | 1.593190 | 0.5440 | 0.7962 |
| 11 | 2062.1589 | 0.2000 | | | | |
| 12 | 47.5676 | 6.5000 | 22.80 | 1.808095 | 0.6307 | 0.6596 |
| 13 | 213.5680 | 2.5000 | 32.30 | 1.738000 | 0.5900 | 0.7154 |
| 14 | 25.4452 | 2.5000 | | | | |
| 15 | 28.1569 | 12.0000 | 91.36 | 1.456000 | 0.5342 | 0.8399 |
| 16 | −51.3695 | 2.5000 | 60.20 | 1.640000 | 0.5377 | 0.8593 |
| 17 | 32.6237 | 30.3130 | | | | |

[Lens Group Data]

| Group | First surface | Focal length |
|---|---|---|
| G1 | 2 | −275.012 |
| G2 | 5 | 50.765 |
| G3 | 12 | −65.154 |

[Conditional Expression Corresponding Value]

Conditional Expression (1)

| | |
|---|---|
| [positive meniscus lens L12] | νd1 = 82.57 |
| [positive lens L21] | νd1 = 82.57 |
| [positive lens L22] | νd1 = 91.36 |
| [positive lens L33] | νd1 = 91.36 |

Conditional Expression (2)

| | |
|---|---|
| [negative lens L23] | νd2 = 34.70 |
| Conditional Expression (3) | hmax = 18.79 |

TABLE 2-continued

| Conditional Expression (4) | |
|---|---|
| [positive meniscus lens L12] | θgF1 − (−0.00168 × vd1) − 0.644 = 0.0333 |
| [positive lens L21] | θgF1 − (−0.00168 × vd1) − 0.644 = 0.0023 |
| [positive lens L22] | θgF1 − (−0.00168 × vd1) − 0.644 = 0.0437 |
| [positive lens L33] | θgF1 − (−0.00168 × vd1) − 0.644 = 0.0437 |
| Conditional Expression (5) | |
| [negative lens L23] | θgF2 − (−0.00168 × vd1) − 0.644 = −0.0023 |
| Conditional Expression (6) | |
| [positive meniscus lens L12] | θgF1 = 0.5386 |
| [positive lens L21] | θgF1 = 0.5386 |
| [positive lens L22] | θgF1 = 0.5342 |
| [positive lens L33] | θgF1 = 0.5342 |
| Conditional Expression (7) | |
| [negative lens L23] | θgF2 = 0.5834 |
| Conditional Expression (8) | FOV = 25 |
| Conditional Expression (9) | Φmax = 49.5 |
| Conditional Expression (10) | FOV/Fh = 0.4167 |
| Conditional Expression (11) | |
| [positive meniscus lens L12] | θCt1 − (0.0048 × vd1) − 0.542 = −0.1208 |
| [positive lens L21] | θCt1 − (0.0048 × vd1) − 0.542 = −0.1208 |
| [positive lens L22] | θCt1 − (0.0048 × vd1) − 0.542 = −0.1406 |
| [positive lens L33] | θCt1 − (0.0048 × vd1) − 0.542 = −0.1406 |
| Conditional Expression (12) | |
| [negative lens L23] | θCt2 − (0.0048 × vd2) − 0.542 = 0.0181 |
| Conditional Expression (13) | |
| [positive meniscus lens L12] | θCt1 = 0.8175 |
| [positive lens L21] | θCt1 = 0.8175 |
| [positive lens L22] | θCt1 = 0.8399 |
| [positive lens L33] | θCt1 = 0.8399 |
| Conditional Expression (14) | |
| [negative lens L23] | θCt2 = 0.7267 |
| Conditional Expression (15) | (−Fh1)/Fh = 4.584 |
| Conditional Expression (16) | Fh2/Fh = 0.846 |
| Conditional Expression (17) | (−Fh3)/Fh = 1.086 |
| Conditional Expression (18) | vd3 = 22.80 |
| | vd4 = 32.30 |
| Conditional Expression (19) | (FOV/Fh) × (NAob × Fob) = 4.17 |
| Conditional Expression (20) | Φb × θb = 70.8 |

Figure 5:
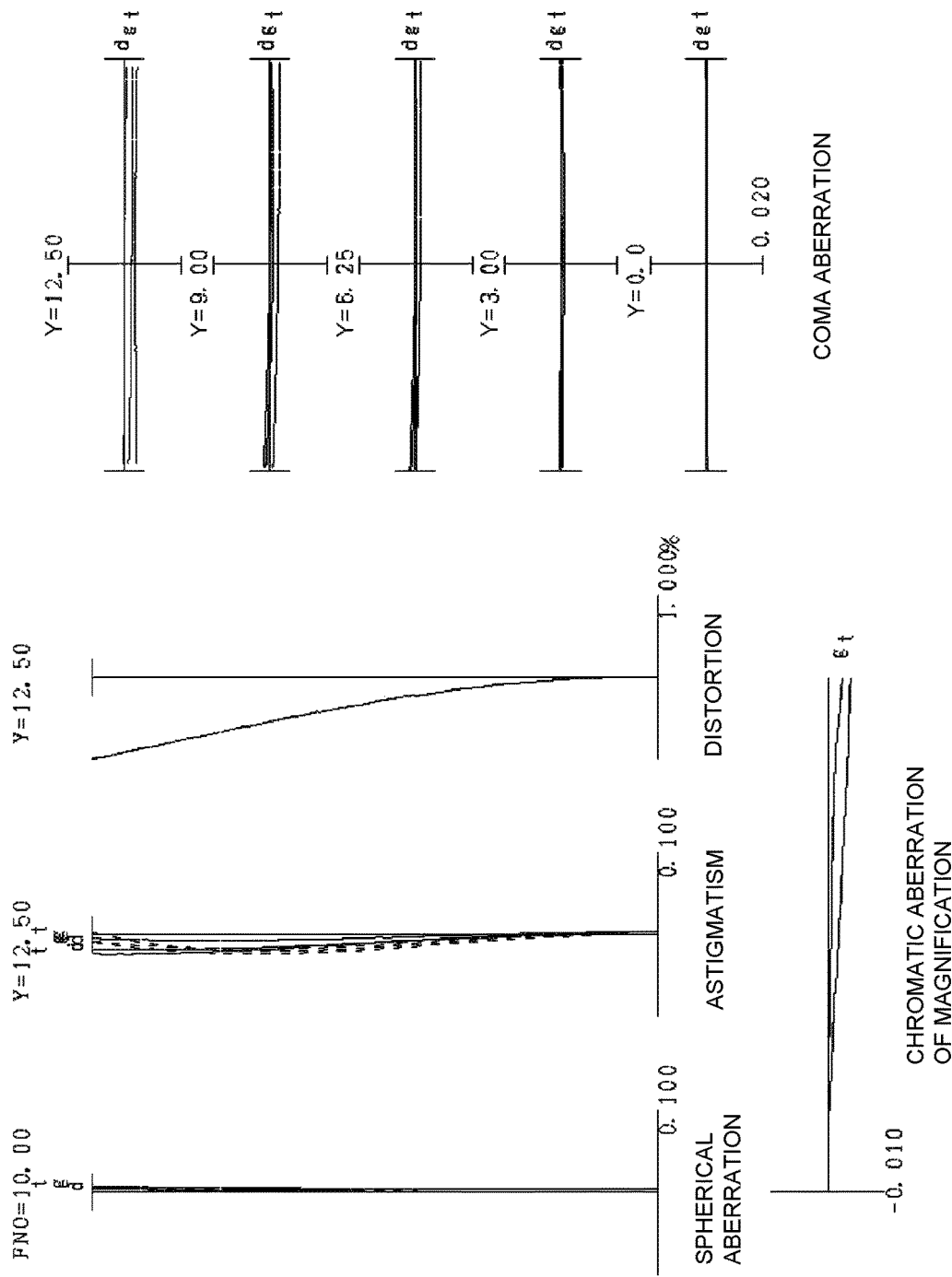
FIG. 5 shows various aberration graphs of the scanning optical system according to the second example.

FIG. 5 shows various aberration graphs of the scanning optical system according to the second example. Each aberration graph shows that in the scanning optical system according to the second example, various aberrations, such as the chromatic aberration of magnification, are favorably corrected in the wide wavelength region ranging from g-line to t-line, and the system has an excellent imaging performance.

Third Example

The third example is described with reference to FIGS. 6 and 7 and Table 3. FIG. 6 shows a lens configuration of a scanning optical system according to the third example of the first to sixth embodiments. A scanning optical system SL(3) according to the third example comprises: a first lens group G1 having a negative refractive power; a second lens group G2 having a positive refractive power; and a third lens group G3 having a negative refractive power, the lens groups being arranged sequentially from the side of the pupil conjugate surface P.

The first lens group G1 comprises a negative meniscus lens L11 with a concave surface facing the side of the pupil conjugate surface P. The second lens group G2 comprises: a positive meniscus lens L21 with a concave surface facing the side of the pupil conjugate surface P; a cemented lens of a biconvex positive lens L22, and a negative meniscus lens L23 with a concave surface facing the side of the pupil conjugate surface P; and a biconvex positive lens L24, the lenses being arranged sequentially from the side of the pupil conjugate surface P. The third lens group G3 comprises: a first cemented lens of a positive meniscus lens L31 with a convex surface facing the side of the pupil conjugate surface P, and a negative meniscus lens L32 with a convex surface facing the side of the pupil conjugate surface P; and a second cemented lens of a biconvex positive lens L33, and a biconcave negative lens L34, the lenses being arranged sequentially from the side of the pupil conjugate surface P. An image surface I is arranged on the third lens group G3 on the side toward the objective lens.

The following Table 3 lists values of data on the scanning optical system according to the third example.

TABLE 3

| [General Data] |
| --- |
| Fh = 60 |
| FOV = 25 |
| NAob = 1 |
| Fob = 10 |
| Φb = 6 |
| θb = 11.8 |

[ Lens Data]

| Surface Number | R | D | νd | nd | θgF | θCt |
| --- | --- | --- | --- | --- | --- | --- |
| 1 | ∞ | 53.3500 | | | | |
| 2 | −25.0182 | 10.0000 | 64.14 | 1.516800 | 0.5357 | 0.8647 |
| 3 | −53.7878 | 8.5000 | | | | |
| 4 | −504.7816 | 9.0000 | 82.57 | 1.497820 | 0.5386 | 0.8175 |
| 5 | −41.7126 | 0.5000 | | | | |
| 6 | 224.3104 | 12.5000 | 82.57 | 1.497820 | 0.5386 | 0.8175 |
| 7 | −41.0225 | 2.7000 | 34.70 | 1.720467 | 0.5834 | 0.7267 |
| 8 | −116.3799 | 0.2000 | | | | |
| 9 | 56.0783 | 9.0000 | 67.90 | 1.593190 | 0.5440 | 0.7962 |
| 10 | −582.1135 | 0.2000 | | | | |
| 11 | 45.7256 | 7.0000 | 22.80 | 1.808095 | 0.6307 | 0.6596 |
| 12 | 179.3373 | 3.0000 | 32.30 | 1.738000 | 0.5900 | 0.7154 |
| 13 | 21.6575 | 2.0000 | | | | |
| 14 | 21.7592 | 14.5000 | 91.36 | 1.456000 | 0.5342 | 0.8399 |
| 15 | −50.7847 | 2.5000 | 60.20 | 1.640000 | 0.5377 | 0.8593 |
| 16 | 30.2698 | 30.3911 | | | | |

[Lens Group Data]

| Group | First surface | Focal length |
| --- | --- | --- |
| G1 | 2 | −102.666 |
| G2 | 4 | 41.948 |
| G3 | 11 | −65.054 |

[Conditional Expression Corresponding Value]

Conditional Expression (1)

| | |
| --- | --- |
| [positive meniscus lens L21] | νd1 = 82.57 |
| [positive lens L22] | νd1 = 82.57 |
| [positive lens L33] | νd1 = 91.36 |

Conditional Expression (2)

| | |
| --- | --- |
| [negative meniscus lens L23] | νd2 = 34.70 |
| Conditional Expression (3) | hmax = 19.56 |

Conditional Expression (4)

| | |
| --- | --- |
| [positive meniscus lens L21] | θgF1 − (−0.00168 × νd1) − 0.644 = 0.0333 |
| [positive lens L22] | θgF1 − (−0.00168 × νd1) − 0.644 = 0.0333 |
| [positive lens L33] | θgF1 − (−0.00168 × νd1) − 0.644 = 0.0437 |

Conditional Expression (5)

| | |
| --- | --- |
| [negative meniscus lens L23] | θgF2 − (−0.00168 × νd2) − 0.644 = −0.0023 |

Conditional Expression (6)

| | |
| --- | --- |
| [positive meniscus lens L21] | θgF1 = 0.5386 |
| [positive lens L22] | θgF1 = 0.5386 |
| [positive lens L33] | θgF1 = 0.5342 |

Conditional Expression (7)

| | |
| --- | --- |
| [negative meniscus lens L23] | θgF2 = 0.5834 |
| Conditional Expression (8) | FOV = 25 |
| Conditional Expression (9) | Φmax = 50.0 |
| Conditional Expression (10) | FOV/Fh = 0.4167 |

Conditional Expression (11)

| | |
| --- | --- |
| [positive meniscus lens L21] | θCt1 − (0.0048 × νd1) − 0.542 = −0.1208 |
| [positive lens L22] | θCt1 − (0.0048 × νd1) − 0.542 = −0.1208 |
| [positive lens L33] | θCt1 − (0.0048 × νd1) − 0.542 = −0.1406 |

Conditional Expression (12)

| | |
| --- | --- |
| [negative meniscus lens L23] | θCt2 − (0.0048 × νd2) − 0.542 = 0.0181 |

TABLE 3-continued

| Conditional Expression (13) | |
|---|---|
| [positive meniscus lens L21] | θCt1 = 0.8175 |
| [positive lens L22] | θCt1 = 0.8175 |
| [positive lens L33] | θCt1 = 0.8399 |
| | Conditional Expression (14) |
| [negative meniscus lens L23] | θCt2 = 0.7267 |
| Conditional Expression (15) | (−Fh1)/Fh = 1.711 |
| Conditional Expression (16) | Fh2/Fh = 0.699 |
| Conditional Expression (17) | (−Fh3)/Fh = 1.084 |
| Conditional Expression (18) | νd3 = 22.80 |
| | νd4 = 32.30 |
| Conditional Expression (19) | (FOV/Fh) × (NAob × Fob) = 4.17 |
| Conditional Expression (20) | Φb × θb = 70.8 |

Figure 7:
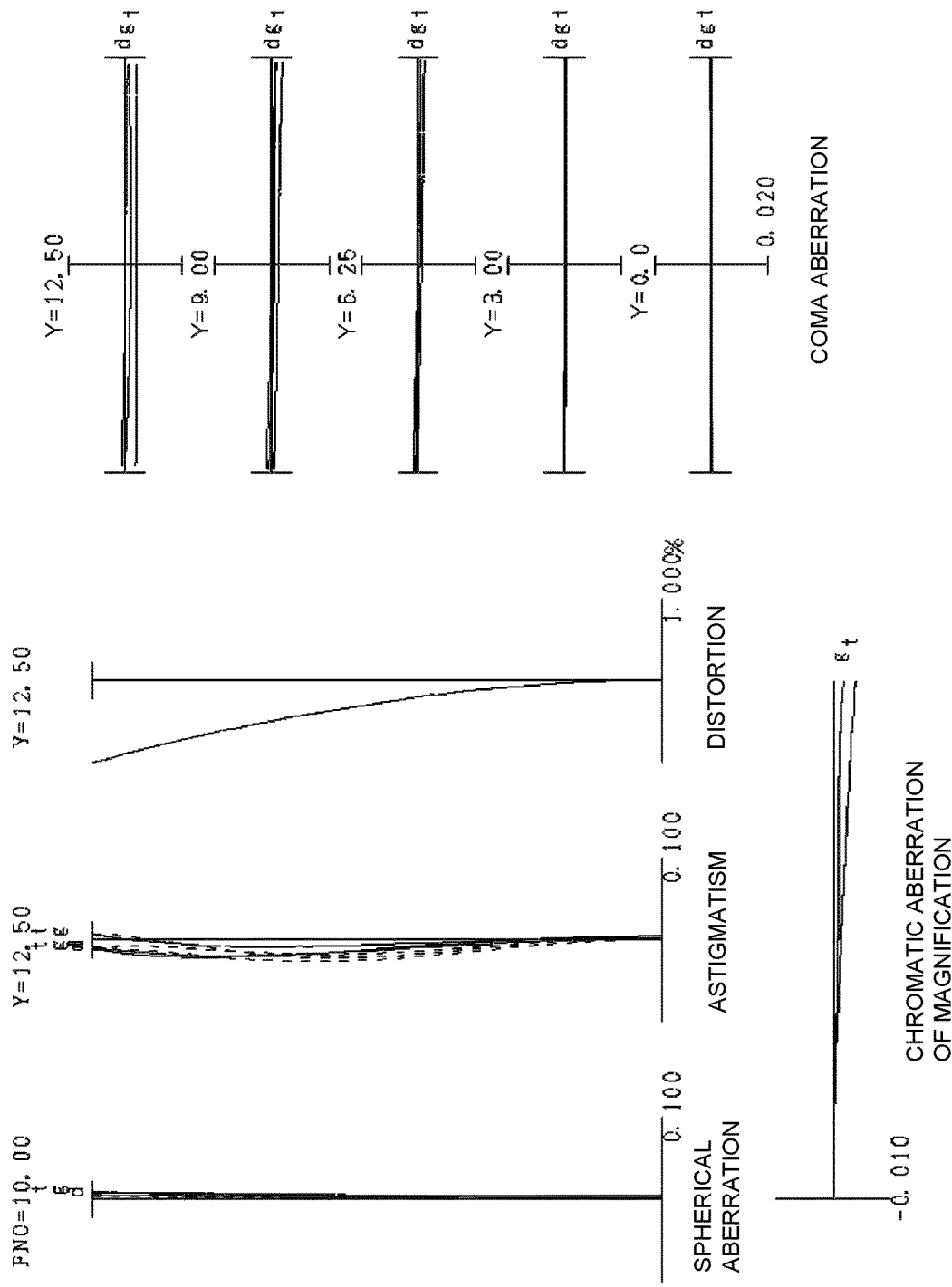
FIG. 7 shows various aberration graphs of the scanning optical system according to the third example.

FIG. 7 shows various aberration graphs of the scanning optical system according to the third example. Each aberration graph shows that in the scanning optical system according to the third example, various aberrations, such as the chromatic aberration of magnification, are favorably corrected in the wide wavelength region ranging from g-line to t-line, and the system has an excellent imaging performance.

Fourth Example

The fourth example is described with reference to FIGS. 8 and 9 and Table 4. FIG. 8 shows a lens configuration of a scanning optical system according to the fourth example of the first to sixth embodiments. A scanning optical system SL(4) according to the fourth example comprises: a first lens group G1 having a negative refractive power; a second lens group G2 having a positive refractive power; and a third lens group G3 having a negative refractive power, the lens groups being arranged sequentially from the side of the pupil conjugate surface P.

The first lens group G1 comprises a negative meniscus lens L11 with a concave surface facing the side of the pupil conjugate surface P. The second lens group G2 comprises: a positive meniscus lens L21 with a concave surface facing the side of the pupil conjugate surface P; a cemented lens of a biconvex positive lens L22, and a negative meniscus lens L23 with a concave surface facing the side of the pupil conjugate surface P; and a biconvex positive lens L24, the lenses being arranged sequentially from the side of the pupil conjugate surface P. The third lens group G3 comprises: a first cemented lens of a positive meniscus lens L31 with a convex surface facing the side of the pupil conjugate surface P, and a negative meniscus lens L32 with a convex surface facing the side of the pupil conjugate surface P; and a second cemented lens of a biconvex positive lens L33, and a biconcave negative lens L34, the lenses being arranged sequentially from the side of the pupil conjugate surface P. An image surface I is arranged on the third lens group G3 on the side toward the objective lens.

The following Table 4 lists values of data on the scanning optical system according to the fourth example.

TABLE 4

| [General Data] |
|---|
| Fh = 60 |
| FOV = 25 |
| NAob = 1 |
| Fob = 10 |
| Φb = 6 |
| θb = 11.8 |

[Lens Data]

| Surface Number | R | D | νd | nd | θgF | θCt |
|---|---|---|---|---|---|---|
| 1 | ∞ | 53.4000 | | | | |
| 2 | −25.0242 | 12.5000 | 64.14 | 1.516800 | 0.5357 | 0.8647 |
| 3 | −54.1369 | 6.0000 | | | | |
| 4 | −640.8906 | 9.5000 | 91.36 | 1.456000 | 0.5342 | 0.8399 |
| 5 | −41.7085 | 0.5000 | | | | |
| 6 | 178.2157 | 12.5000 | 82.57 | 1.497820 | 0.5386 | 0.8175 |
| 7 | −42.4059 | 2.7000 | 34.70 | 1.720467 | 0.5834 | 0.7267 |
| 8 | −108.8746 | 0.2000 | | | | |
| 9 | 56.5598 | 8.5000 | 67.90 | 1.593190 | 0.5440 | 0.7962 |
| 10 | −1309.3827 | 0.2000 | | | | |
| 11 | 47.4110 | 7.5000 | 22.80 | 1.808095 | 0.6307 | 0.6596 |
| 12 | 240.8185 | 3.0000 | 32.30 | 1.738000 | 0.5900 | 0.7154 |
| 13 | 21.5861 | 2.0000 | | | | |
| 14 | 21.7736 | 14.5000 | 91.36 | 1.456000 | 0.5342 | 0.8399 |
| 15 | −57.1461 | 2.5000 | 58.57 | 1.651600 | 0.5416 | 0.8341 |
| 16 | 31.4253 | 30.5716 | | | | |

TABLE 4-continued

[Lens Group Data]

| Group | First surface | Focal length |
|---|---|---|
| G1 | 2 | −105.472 |
| G2 | 4 | 42.184 |
| G3 | 11 | −64.070 |

[Conditional Expression Corresponding Value]

Conditional Expression (1)

| | |
|---|---|
| [positive meniscus lens L21] | νd1 = 91.36 |
| [positive lens L22] | νd1 = 82.57 |
| [positive lens L33] | νd1 = 91.36 |

Conditional Expression (2)

| | |
|---|---|
| [negative meniscus lens L23] | νd2=34.70 |
| Conditional Expression (3) | hmax=19.51 |

Conditional Expression (4)

| | |
|---|---|
| [positive meniscus lens L21] | θgF1 − (−0.00168 × νd1) − 0.644 = 0.0437 |
| [positive lens L22] | θgF1 − (−0.00168 × νd1) − 0.644 = 0.0333 |
| [positive lens L33] | θgF1 − (−0.00168 × νd1) − 0.644 =0.0437 |

Conditional Expression (5)

| | |
|---|---|
| [negative meniscus lens L23] | θgF2 − (−0.00168 × νd2) − 0.644 = −0.0023 |

Conditional Expression (6)

| | |
|---|---|
| [positive meniscus lens L21] | θgF1 = 0.5342 |
| [positive lens L22] | θgF1 = 0.5386 |
| [positive lens L33] | θgF1 = 0.5342 |

Conditional Expression (7)

| | |
|---|---|
| [negative meniscus lens L23] | θgF2 = 0.5834 |
| Conditional Expression (8) | FOV = 25 |
| Conditional Expression (9) | Φmax = 50.0 |
| Conditional Expression (10) | FOV/Fh = 0.4167 |

Conditional Expression (11)

| | |
|---|---|
| [positive meniscus lens L21] | θCt1 − (0.0048 × νd1) − 0.542 = −0.1406 |
| [positive lens L22] | θCt1 − (0.0048 × νd1) − 0.542 = −0.1208 |
| [positive lens L33] | θCt1 − (0.0048 × νd1) − 0.542 = −0.1406 |

Conditional Expression (12)

| | |
|---|---|
| [negative meniscus lens L23] | θCt2 − (0.0048 × νd2) − 0.542 = 0.0181 |

Conditional Expression (13)

| | |
|---|---|
| [positive meniscus lens L21] | θCt1 = 0.8399 |
| [positive lens L22] | θCt1 = 0.8175 |
| [positive lens L33] | θCt1 = 0.8399 |

Conditional Expression (14)

| | |
|---|---|
| [negative meniscus lens L23] | θCt2 = 0.7267 |
| Conditional Expression (15) | (−Fh1)/Fh = 1.758 |
| Conditional Expression (16) | Fh2/Fh = 0.703 |
| Conditional Expression (17) | (−Fh3)/Fh = 1.068 |
| Conditional (18) | νd3 = 22.80 |
| | νd4 = 32.30 |
| Conditional Expression (19) | (FOV/Fh) × (NAob × Fob) = 4.17 |
| Conditional Expression (20) | Φb × θb = 70.8 |

Figure 9:
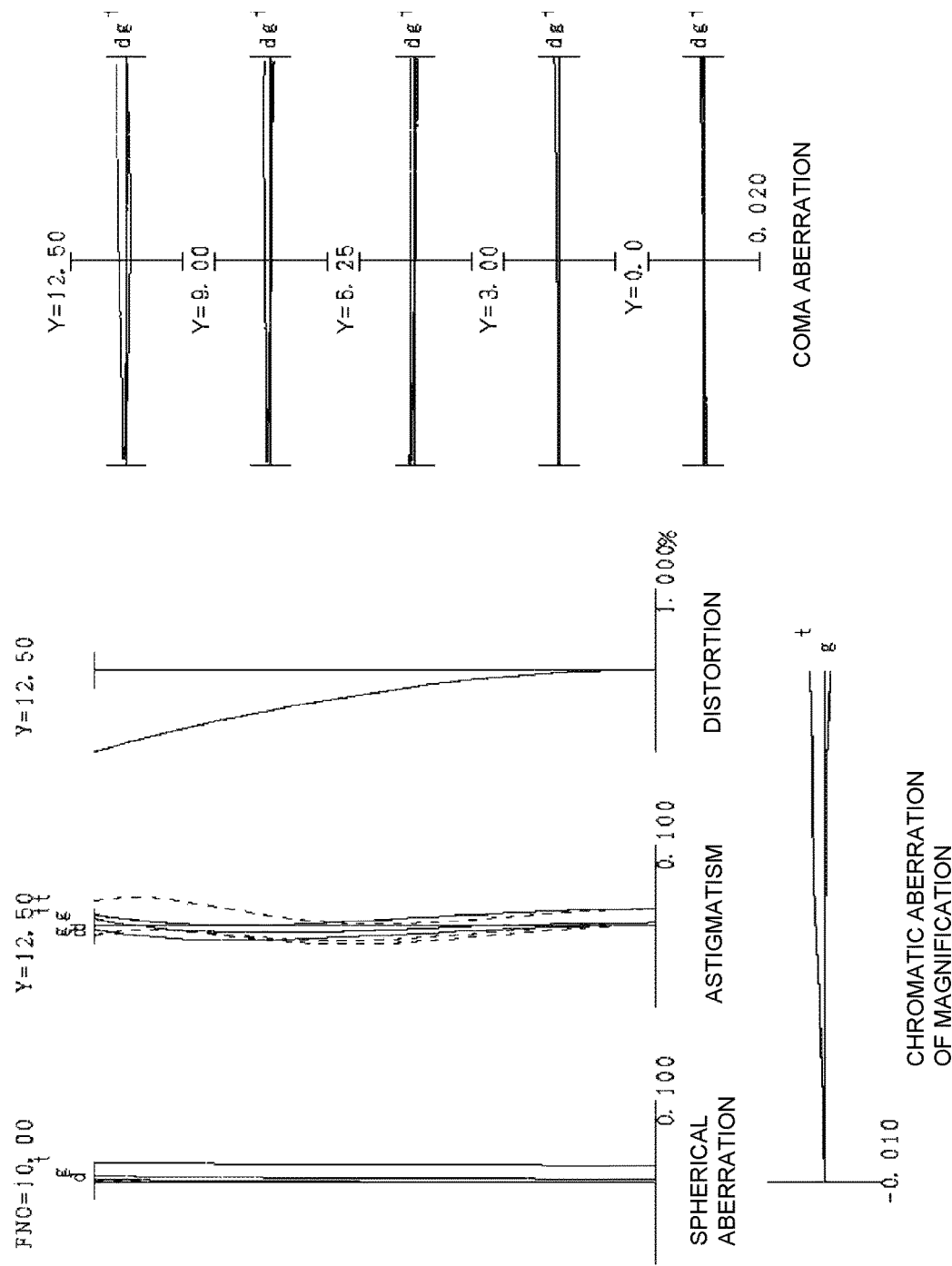
FIG. 9 shows various aberration graphs of the scanning optical system according to the fourth example.

FIG. 9 shows various aberration graphs of the scanning optical system according to the fourth example. Each aberration graph shows that in the scanning optical system according to the fourth example, various aberrations, such as the chromatic aberration of magnification, are favorably corrected in the wide wavelength region ranging from g-line to t-line, and the system has an excellent imaging performance.

Fifth Example

Figure 10:
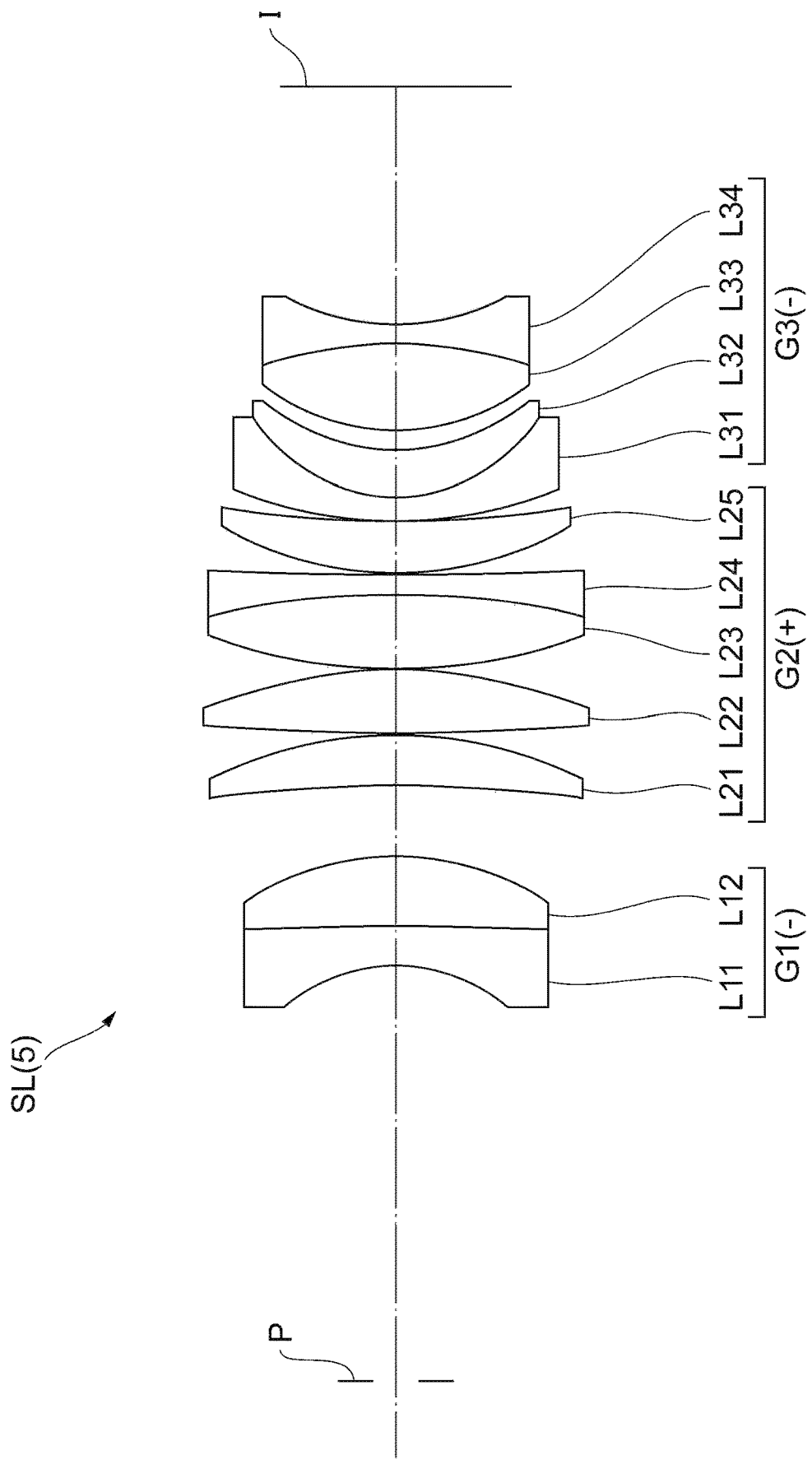
FIG. 10 is a lens configuration diagram of a scanning optical system according to a fifth example.

The fifth example is described with reference to FIGS. 10 and 11 and Table 5. FIG. 10 shows a lens configuration of a scanning optical system according to the fifth example of the first to sixth embodiments. A scanning optical system SL(5) according to the fifth example comprises: a first lens group G1 having a negative refractive power; a second lens group G2 having a positive refractive power; and a third lens group G3 having a negative refractive power, the lens groups being arranged sequentially from the side of the pupil conjugate surface P.

The first lens group G1 comprises a cemented lens of a negative meniscus lens L11 with a concave surface facing the side of the pupil conjugate surface P, and a positive meniscus lens L12 with a concave surface facing the side of the pupil conjugate surface P. The second lens group G2 comprises: a positive meniscus lens L21 with a concave surface facing the side of the pupil conjugate surface P; a biconvex positive lens L22; a cemented lens of a biconvex positive lens L23, and a biconcave negative lens L24; and a positive meniscus lens L25 with a convex surface facing the side of the pupil conjugate surface P, the lenses being arranged sequentially from the side of the pupil conjugate surface P. The third lens group G3 comprises: a first cemented lens of a negative meniscus lens L31 with a convex surface facing the side of the pupil conjugate surface P, and a positive meniscus lens L32 with a convex surface facing the side of the pupil conjugate surface P; and a second cemented lens of a biconvex positive lens L33, and a biconcave negative lens L34, the lenses being arranged sequentially from the side of the pupil conjugate surface P. An image surface I is arranged on the third lens group G3 on the side toward the objective lens.

The following Table 5 lists values of data on the scanning optical system according to the fifth example.

TABLE 5

[General Data]

Fh = 60
FOV = 25
NAob = 1
Fob = 10
Φb = 6
θb = 11.8

[Lens Data]

| Surface Number | R | D | vd | nd | θgF | θCt |
|---|---|---|---|---|---|---|
| 1 | ∞ | 53.1000 | | | | |
| 2 | −23.3790 | 5.0000 | 64.14 | 1.516800 | 0.5357 | 0.8647 |
| 3 | −521.0717 | 9.0000 | 91.36 | 1.456000 | 0.5342 | 0.8399 |
| 4 | −36.5677 | 9.0000 | | | | |
| 5 | −186.5659 | 6.5000 | 82.57 | 1.497820 | 0.5386 | 0.8175 |
| 6 | −55.9777 | 0.2000 | | | | |
| 7 | 323.4123 | 8.0000 | 82.57 | 1.497820 | 0.5386 | 0.8175 |
| 8 | −70.7578 | 0.2000 | | | | |
| 9 | 75.9315 | 9.5000 | 91.36 | 1.456000 | 0.5342 | 0.8399 |
| 10 | −109.1223 | 2.5000 | 34.70 | 1.720467 | 0.5834 | 0.7267 |
| 11 | 747.7880 | 0.2000 | | | | |
| 12 | 46.4635 | 6.5000 | 82.57 | 1.497820 | 0.5386 | 0.8175 |
| 13 | 136.4644 | 0.2000 | | | | |
| 14 | 60.2797 | 3.0000 | 32.30 | 1.738000 | 0.5900 | 0.7154 |
| 15 | 22.4138 | 6.0000 | 22.80 | 1.808095 | 0.6307 | 0.6596 |
| 16 | 28.1885 | 2.5000 | | | | |
| 17 | 29.5269 | 11.0000 | 91.36 | 1.456000 | 0.5342 | 0.8399 |
| 18 | −60.8791 | 2.5000 | 58.57 | 1.651600 | 0.5416 | 0.8341 |
| 19 | 31.8482 | 30.3736 | | | | |

[Lens Group Data]

| Group | First surface | Focal length |
|---|---|---|
| G1 | 2 | −144.778 |
| G2 | 5 | 42.055 |
| G3 | 14 | −53.948 |

[Conditional Expression Corresponding Value]

Conditional Expression (1)

| | |
|---|---|
| [positive meniscus lens L12] | vd1 = 91.36 |
| [positive meniscus lens L21] | vd1 = 82.57 |
| [positive lens L22] | vd1 = 82.57 |
| [positive lens L23] | vd1 = 91.36 |
| [positive meniscus lens L25] | vd1 = 82.57 |
| [positive lens L33] | vd1 = 91.36 |

Conditional Expression (2)

| | |
|---|---|
| [negative lens L24] | vd2 = 34.70 |
| Conditional Expression (3) | hmax = 19.62 |

Conditional Expression (4)

| | |
|---|---|
| [positive meniscus lens L12] | θgF1 − (−0.00168 × vd1) − 0.644 = 0.0437 |
| [positive meniscus lens L21] | θgF1 − (−0.00168 × vd1) − 0.644 = 0.0333 |
| [positive lens L22] | θgF1 − (−0.00168 × vd1) − 0.644 = 0.0333 |
| [positive lens L23] | θgF1 − (−0.00168 × vd1) − 0.644 = 0.0437 |
| [positive meniscus lens L25] | θgF1 − (−0.00168 × vd1) − 0.644 = 0.0333 |
| [positive lens L33] | θgF1 − (−0.00168 × vd1) − 0.644 = 0.0437 |

TABLE 5-continued

| Conditional Expression (5) | |
|---|---|
| [negative lens L24] | $\theta gF2 - (-0.00168 \times vd1) - 0.644 = -0.0023$ |
| Conditional Expression (6) | |
| [positive meniscus lens L12] | $\theta gF1 = 0.5342$ |
| [positive meniscus lens L21] | $\theta gF1 = 0.5386$ |
| [positive lens L22] | $\theta gF1 = 0.5386$ |
| [positive lens L23] | $\theta gF1 = 0.5342$ |
| [positive meniscus lens L25] | $\theta gF1 = 0.5386$ |
| [positive lens L33] | $\theta gF1 = 0.5342$ |
| Conditional Expression (7) | |
| [negative lens L24] | $\theta gF2 = 0.5834$ |
| Conditional Expression (8) | FOV = 25 |
| Conditional Expression (9) | $\Phi max = 51.0$ |
| Conditional Expression (10) | FOV/Fh = 0.4167 |
| Conditional Expression (11) | |
| [positive meniscus lens L12] | $\theta Ct1 - (0.0048 \times vd1) - 0.542 = -0.1406$ |
| [positive meniscus lens L21] | $\theta Ct1 - (0.0048 \times vd1) - 0.542 = -0.1208$ |
| [positive lens L22] | $\theta Ct1 - (0.0048 \times vd1) - 0.542 = -0.1208$ |
| [positive lens L23] | $\theta Ct1 - (0.0048 \times vd1) - 0.542 = -0.1406$ |
| [positive meniscus lens L25] | $\theta Ct1 - (0.0048 \times vd1) - 0.542 = -0.1208$ |
| [positive lens L33] | $\theta Ct1 - (0.0048 \times vd1) - 0.542 = -0.1406$ |
| Conditional Expression (12) | |
| [negative lens L24] | $\theta Ct2 - (0.0048 \times vd2) - 0.542 = 0.0181$ |
| Conditional Expression (13) | |
| [positive meniscus lens L12] | $\theta Ct1 = 0.8399$ |
| [positive meniscus lens L21] | $\theta Ct1 = 0.8175$ |
| [positive lens L22] | $\theta Ct1 = 0.8175$ |
| [positive lens L23] | $\theta Ct1 = 0.8399$ |
| [positive meniscus lens L25] | $\theta Ct1 = 0.8175$ |
| [positive lens L33] | $\theta Ct1 = 0.8399$ |
| Conditional Expression (14) | |
| [negative lens L24] | $\theta Ct2 = 0.7267$ |
| Conditional Expression (15) | $(-Fh1)/Fh = 2.413$ |
| Conditional Expression (16) | $Fh2/Fh = 0.701$ |
| Conditional Expression (17) | $(-Fh3)/Fh = 0.899$ |
| Conditional Expression (18) | $vd3 = 22.80$ |
| | $vd4 = 32.30$ |
| Conditional Expression (19) | $(FOV/Fh) \times (NAob \times Fob) = 4.17$ |
| Conditional Expression (20) | $\Phi b \times \theta b = 70.8$ |

Figure 11:
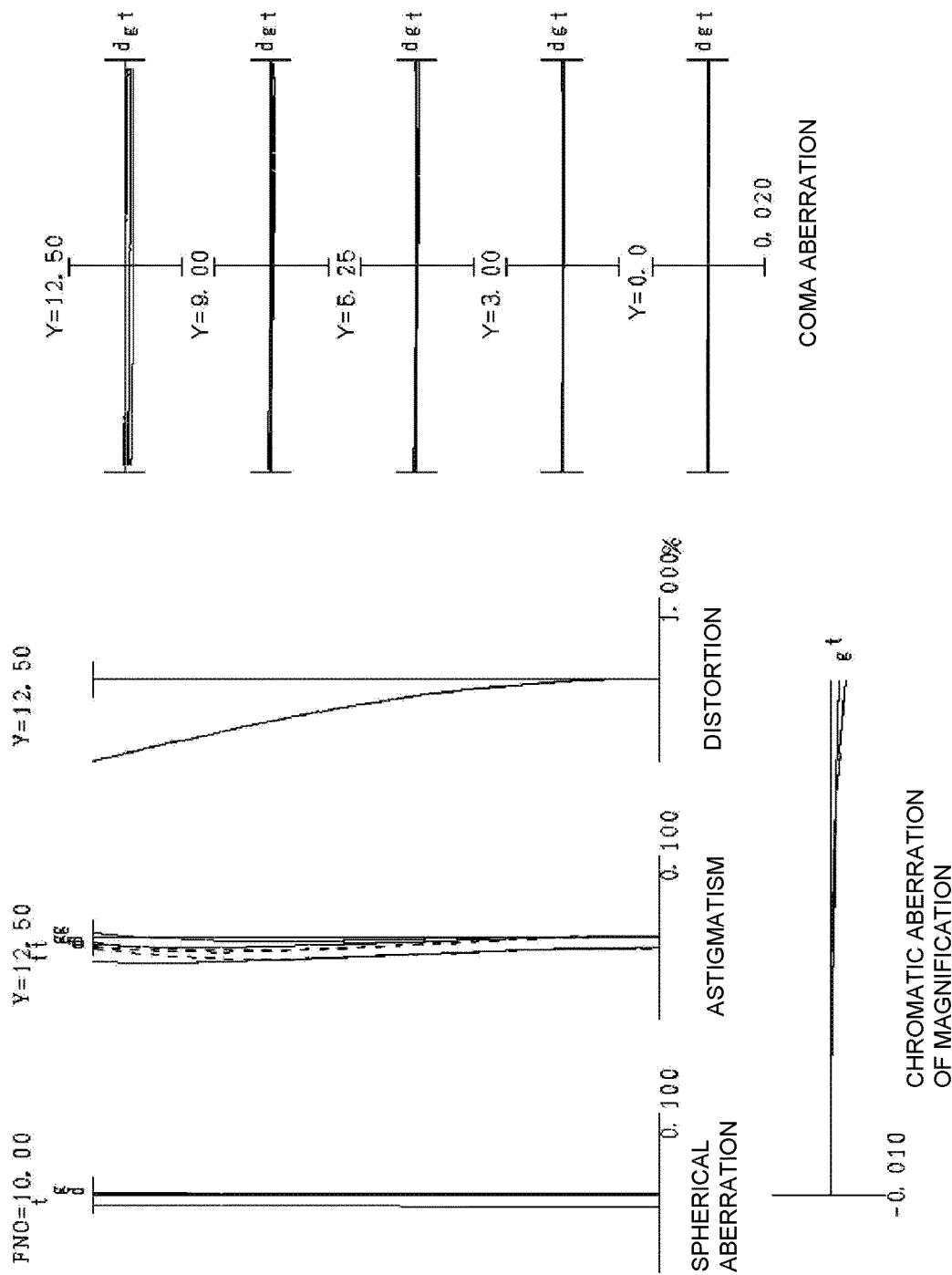
FIG. 11 shows various aberration graphs of the scanning optical system according to the fifth example.

FIG. 11 shows various aberration graphs of the scanning optical system according to the fifth example. Each aberration graph shows that in the scanning optical system according to the fifth example, various aberrations, such as the chromatic aberration of magnification, are favorably corrected in the wide wavelength region ranging from g-line to t-line, and the system has an excellent imaging performance.

Sixth Example

Figure 12:
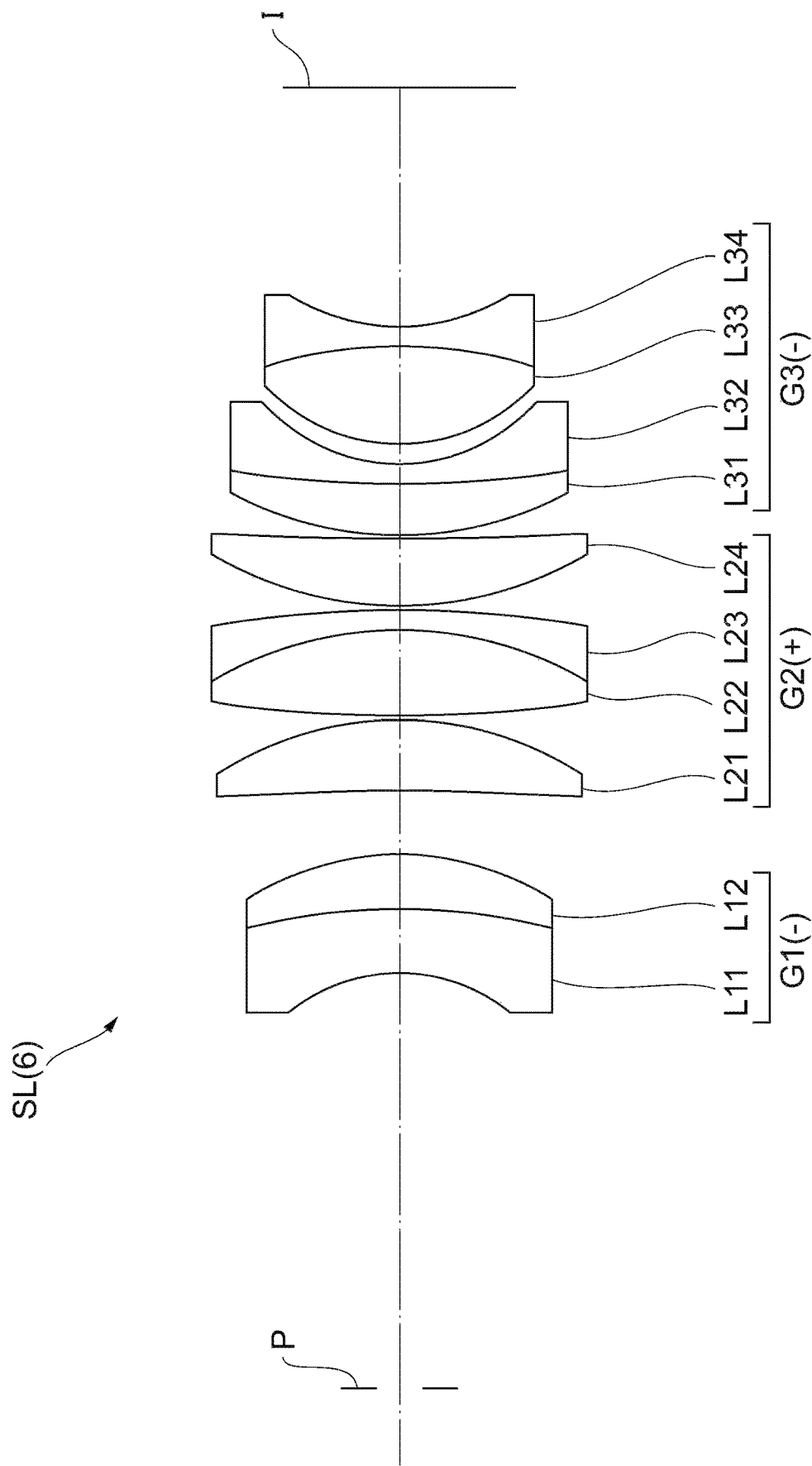
FIG. 12 is a lens configuration diagram of a scanning optical system according to a sixth example.

The sixth example is described with reference to FIGS. 12 and 13 and Table 6. FIG. 12 shows a lens configuration of a scanning optical system according to the sixth example of the first to sixth embodiments. A scanning optical system SL(6) according to the sixth example comprises: a first lens group G1 having a negative refractive power; a second lens group G2 having a positive refractive power; and a third lens group G3 having a negative refractive power, the lens groups being arranged sequentially from the side of the pupil conjugate surface P.

The first lens group G1 comprises a cemented lens of a negative meniscus lens L11 with a concave surface facing the side of the pupil conjugate surface P, and a positive meniscus lens L12 with a concave surface facing the side of the pupil conjugate surface P. The second lens group G2 comprises: a positive meniscus lens L21 with a concave surface facing the side of the pupil conjugate surface P; a cemented lens of a biconvex positive lens L22, and a negative meniscus lens L23 with a concave surface facing the side of the pupil conjugate surface P; and a positive meniscus lens L24 with a convex surface facing the side of the pupil conjugate surface P, the lenses being arranged sequentially from the side of the pupil conjugate surface P. The third lens group G3 comprises: a first cemented lens of a positive meniscus lens L31 with a convex surface facing the side of the pupil conjugate surface P, and a negative meniscus lens L32 with a convex surface facing the side of the pupil conjugate surface P; and a second cemented lens of a biconvex positive lens L33, and a biconcave negative lens L34, the lenses being arranged sequentially from the side of the pupil conjugate surface P. An image surface I is arranged on the third lens group G3 on the side toward the objective lens.

The following Table 6 lists values of data on the scanning optical system according to the sixth example.

TABLE 6

[General Data]

Fh = 60
FOV = 25
NAob = 1
Fob = 10
Φb = 6
θb = 11.8

[Lens Data]

| Surface Number | R | D | νd | nd | θgF | θCt |
|---|---|---|---|---|---|---|
| 1 | ∞ | 52.7000 | | | | |
| 2 | −23.3121 | 8.0000 | 67.85 | 1.458504 | 0.5281 | 0.9062 |
| 3 | −83.9105 | 7.0000 | 82.57 | 1.497820 | 0.5386 | 0.8175 |
| 4 | −38.1125 | 8.0000 | | | | |
| 5 | −416.3051 | 9.0000 | 91.36 | 1.456000 | 0.5342 | 0.8399 |
| 6 | −45.3519 | 0.5000 | | | | |
| 7 | 161.0017 | 11.0000 | 91.36 | 1.456000 | 0.5342 | 0.8399 |
| 8 | −49.1879 | 2.5000 | 34.70 | 1.720467 | 0.5834 | 0.7267 |
| 9 | −147.7998 | 0.5000 | | | | |
| 10 | 48.8897 | 8.5000 | 67.90 | 1.593190 | 0.5440 | 0.7962 |
| 11 | 459.9026 | 0.5000 | | | | |
| 12 | 48.2794 | 6.5000 | 22.80 | 1.808095 | 0.6307 | 0.6596 |
| 13 | 153.1202 | 2.5000 | 32.30 | 1.738000 | 0.5900 | 0.7154 |
| 14 | 24.6361 | 2.5000 | | | | |
| 15 | 24.8900 | 12.5000 | 91.36 | 1.456000 | 0.5342 | 0.8399 |
| 16 | −61.8989 | 2.5000 | 60.20 | 1.640000 | 0.5377 | 0.8593 |
| 17 | 28.8701 | 30.2538 | | | | |

[Lens Group Data]

| Group | First surface | Focal length |
|---|---|---|
| G1 | 2 | −233.022 |
| G2 | 5 | 47.089 |
| G3 | 12 | −61.973 |

[Conditional Expression Corresponding Value]

Conditional Expression (1)

| | |
|---|---|
| [positive meniscus lens L12] | νd1 = 82.57 |
| [positive meniscus lens L21] | νd1 = 91.36 |
| [positive lens L22] | νd1 = 91.36 |
| [positive lens L33] | νd1 = 91.36 |

Conditional Expression (2)

| | |
|---|---|
| [negative meniscus lens L23] | νd2 = 34.70 |
| Conditional Expression (3) | hmax = 18.96 |

Conditional Expression (4)

| | |
|---|---|
| [positive meniscus lens L12] | θgF1 − (−0.00168 × νd1) − 0.644 = 0.0333 |
| [positive meniscus lens L21] | θgF1 − (−0.00168 × νd1) − 0.644 = 0.0437 |
| [positive lens L22] | θgF1 − (−0.00168 × νd1) − 0.644 = 0.0437 |
| [positive lens L33] | θgF1 − (−0.00168 × νd1) − 0.644 = 0.0437 |

Conditional Expression (5)

| | |
|---|---|
| [negative meniscus lens L23] | θgF2 − (−0.00168 × νd2) − 0.644 = −0.0023 |

Conditional Expression (6)

| | |
|---|---|
| [positive meniscus lens L12] | θgF1 = 0.5386 |
| [positive meniscus lens L21] | θgF1 = 0.5342 |
| [positive lens L22] | θgF1 = 0.5342 |
| [positive lens L33] | θgF1 = 0.5342 |

Conditional Expression (7)

| | |
|---|---|
| [negative meniscus lens L23] | θgF2 = 0.5834 |
| Conditional Expression (8) | FOV = 25 |
| Conditional Expression (9) | Φmax = 49.0 |
| Conditional Expression (10) | FOV/Fh = 0.4167 |

Conditional Expression (11)

| | |
|---|---|
| [positive meniscus lens L12] | θgF1 − (0.0048 × νd1) − 0.542 = −0.1208 |
| [positive meniscus lens L21] | θgF1 − (0.0048 × νd1) − 0.542 = −0.1406 |
| [positive lens L22] | θgF1 − (0.0048 × νd1) − 0.542 = −0.1406 |
| [positive lens L33] | θgF1 − (0.0048 × νd1) − 0.542 = −0.1406 |

TABLE 6-continued

| Conditional Expression (12) | |
|---|---|
| [negative meniscus lens L23] | @Ct2-(0.0048xvd2) -0.542=0.0181 |
| Conditional Expression (13) | |
| [positive meniscus lens L12] | θCt1 = 0.8175 |
| [positive meniscus lens L21] | θCt1 = 0.8399 |
| [positive lens L22] | θCt1 = 0.8399 |
| [positive lens L33] | θCt1 = 0.8399 |
| Conditional Expression (14) | |
| [negative meniscus lens L23] | θCt2 = 0.7267 |
| Conditional Expression (15) | (−Fh1)/Fh = 3.884 |
| Conditional Expression (16) | Fh2/Fh = 0.785 |
| Conditional Expression (17) | (−Fh3)/Fh = 1.033 |
| Conditional Expression (18) | vd3 = 22.80 |
| | vd4 = 32.30 |
| Conditional Expression (19) | (FOV/Fh) × (NAob × Fob) = 4.17 |
| Conditional Expression (20) | Φb × θb = 70.8 |

Figure 13:
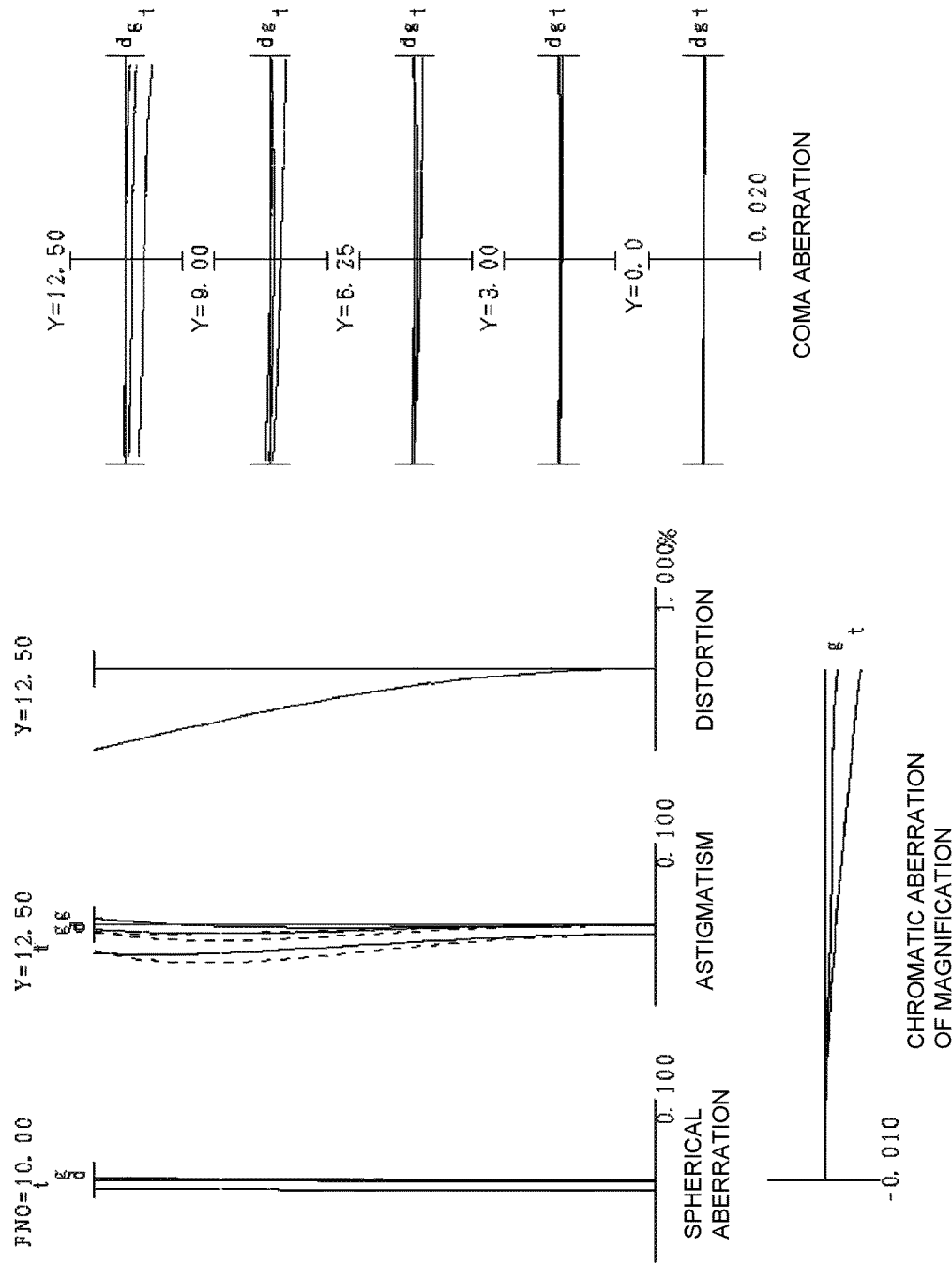
FIG. 13 shows various aberration graphs of the scanning optical system according to the sixth example.

FIG. 13 shows various aberration graphs of the scanning optical system according to the sixth example. Each aberration graph shows that in the scanning optical system according to the sixth example, various aberrations, such as the chromatic aberration of magnification, are favorably corrected in the wide wavelength region ranging from g-line to t-line, and the system has an excellent imaging performance.

Seventh Example

Figure 14:
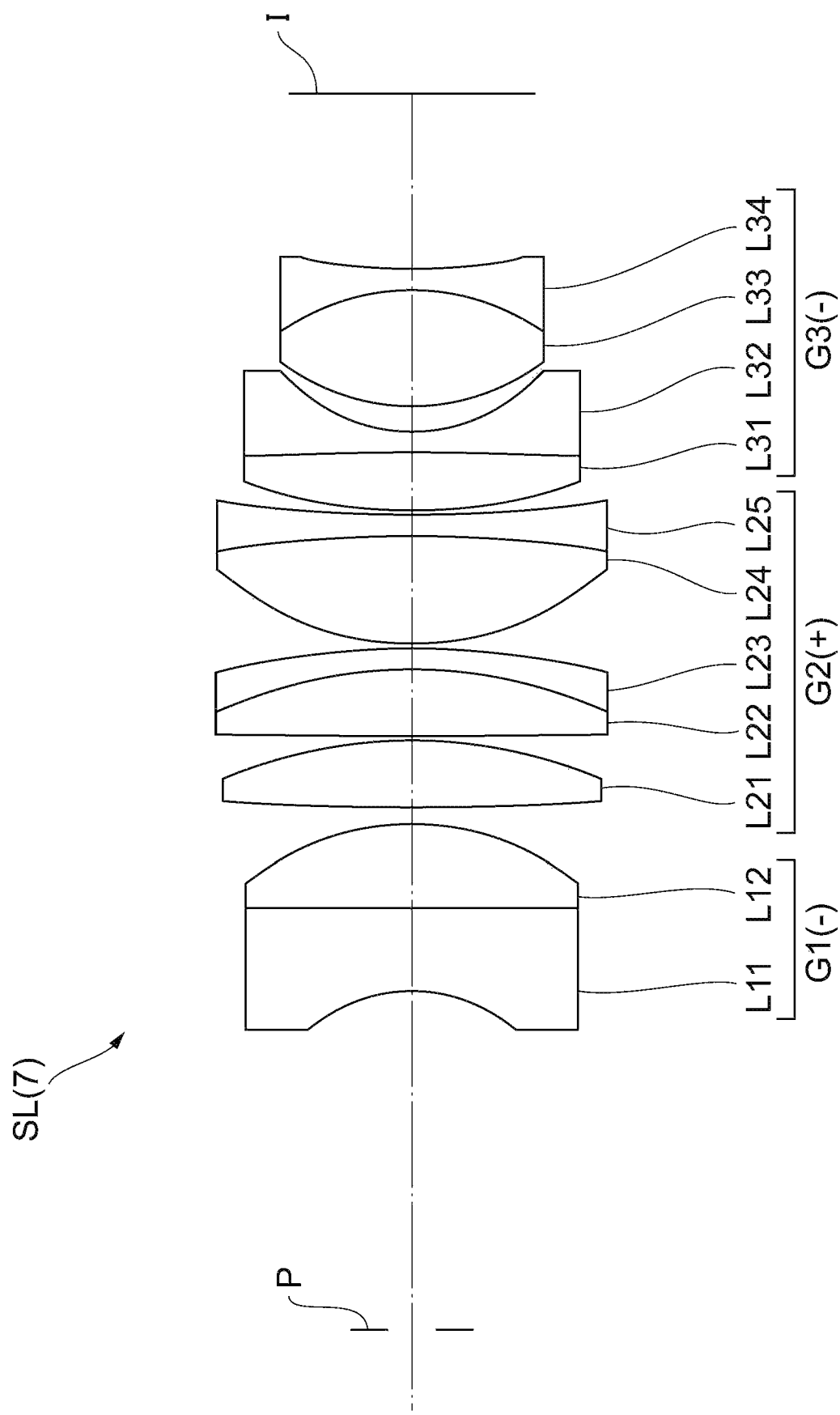
FIG. 14 is a lens configuration diagram of a scanning optical system according to a seventh example.

The seventh example is described with reference to FIGS. 14 and 15 and Table 7. FIG. 14 shows a lens configuration of a scanning optical system according to the seventh example of the first to sixth embodiments. A scanning optical system SL(7) according to the seventh example comprises: a first lens group G1 having a negative refractive power; a second lens group G2 having a positive refractive power; and a third lens group G3 having a negative refractive power, the lens groups being arranged sequentially from the side of the pupil conjugate surface P.

The first lens group G1 comprises a cemented lens of a biconcave negative lens L11, and a biconvex positive lens L12. The second lens group G2 comprises: a biconvex positive lens L21; a first cemented lens of a biconvex positive lens L22, and a negative meniscus lens L23 with a concave surface facing the side of the pupil conjugate surface P; and a second cemented lens of a biconvex positive lens L24, and a biconcave negative lens L25, the lenses being arranged sequentially from the side of the pupil conjugate surface P. The third lens group G3 comprises: a first cemented lens of a biconvex positive lens L31, and a biconcave negative lens L32; and a second cemented lens of a biconvex positive lens L33, and a biconcave negative lens L34, the lenses being arranged sequentially from the side of the pupil conjugate surface P. An image surface I is arranged on the third lens group G3 on the side toward the objective lens.

The following Table 7 lists values of data on the scanning optical system according to the seventh example.

TABLE 7

| [General Data] |
|---|
| Fh = 60 |
| FOV = 25 |
| NAob = 1 |
| Fob = 10 |
| Φb = 6 |
| θb = 11.8 |

| [Lens Data] | | | | | | |
|---|---|---|---|---|---|---|
| Surface Number | R | D | vd | nd | θgF | θCt |
| 1 | ∞ | 40.5500 | | | | |
| 2 | −20.5406 | 10.0000 | 64.14 | 1.516800 | 0.5357 | 0.8647 |
| 3 | 4483.9932 | 10.0000 | 82.57 | 1.497820 | 0.5386 | 0.8175 |
| 4 | −33.2276 | 2.0000 | | | | |
| 5 | 459.9767 | 8.0000 | 82.57 | 1.497820 | 0.5386 | 0.8175 |
| 6 | −62.4493 | 0.5000 | | | | |
| 7 | 1234.9246 | 8.0000 | 91.36 | 1.456000 | 0.5342 | 0.8399 |
| 8 | −59.8704 | 2.5000 | 44.27 | 1.613397 | 0.5633 | 0.7825 |
| 9 | −106.5074 | 0.5000 | | | | |
| 10 | 36.6007 | 13.0000 | 67.90 | 1.593190 | 0.5440 | 0.7962 |
| 11 | −163.4401 | 2.5000 | 34.70 | 1.720467 | 0.5834 | 0.7267 |
| 12 | 171.5632 | 0.5000 | | | | |
| 13 | 61.9995 | 7.0000 | 22.80 | 1.808095 | 0.6307 | 0.6596 |
| 14 | −522.0253 | 2.5000 | 32.30 | 1.738000 | 0.5900 | 0.7154 |
| 15 | 21.6480 | 3.0000 | | | | |
| 16 | 27.3158 | 14.0000 | 91.36 | 1.456000 | 0.5342 | 0.8399 |

TABLE 7-continued

| 17 | −28.7338 | 2.5000  | 60.20 | 1.640000 | 0.5416 | 0.8341 |
|----|----------|---------|-------|----------|--------|--------|
| 18 | 69.8098  | 21.1140 |       |          |        |        |

[Lens Group Data]

| Group | First surface | Focal length |
|-------|---------------|--------------|
| G1    | 2             | −193.035     |
| G2    | 5             | 41.909       |
| G3    | 13            | −55.895      |

[Conditional Expression Corresponding Value]

Conditional Expression (1)

| [positive lens L12] | $\nu d1 = 82.57$ |
| [positive lens L21] | $\nu d1 = 82.57$ |
| [positive lens L22] | $\nu d1 = 91.36$ |
| [positive lens L33] | $\nu d1 = 91.36$ |

Conditional Expression (2)

| [negative meniscus lens L23] | $\nu d2 = 44.30$ |
| [negative lens L25]          | $\nu d2 = 34.70$ |
| Conditional Expression (3)   | $hmax = 19.25$   |

Conditional Expression (4)

| [positive lens L12] | $\theta gF1 - (-0.00168 \times \nu d1) - 0.644 = 0.0333$ |
| [positive lens L21] | $\theta gF1 - (-0.00168 \times \nu d1) - 0.644 = 0.0333$ |
| [positive lens L22] | $\theta gF1 - (-0.00168 \times \nu d1) - 0.644 = 0.0437$ |
| [positive lens L33] | $\theta gF1 - (-0.00168 \times \nu d1) - 0.644 = 0.0437$ |

Conditional Expression (5)

| [negative meniscus lens L23] | $\theta gF2 - (-0.00168 \times \nu d2) - 0.644 = -0.0063$ |
| [negative lens L25]          | $\theta gF2 - (-0.00168 \times \nu d2) - 0.644 = -0.0023$ |

Conditional Expression (6)

| [positive lens L12] | $\theta gF1 = 0.5386$ |
| [positive lens L21] | $\theta gF1 = 0.5386$ |
| [positive lens L22] | $\theta gF1 = 0.5342$ |
| [positive lens L33] | $\theta gF1 = 0.5342$ |

Conditional Expression (7)

| [negative meniscus lens L23] | $\theta gF2 = 0.5633$ |
| [negative lens L25]          | $\theta gF2 = 0.5834$ |
| Conditional Expression (8)   | $FOV = 25$            |
| Conditional Expression (9)   | $\Phi max = 48.5$     |
| Conditional Expression (10)  | $FOV/Fh = 0.5000$     |

Conditional Expression (11)

| [positive lens L12] | $\theta Ct1 - (0.0048 \times \nu d1) - 0.542 = -0.1208$ |
| [positive lens L21] | $\theta Ct1 - (0.0048 \times \nu d1) - 0.542 = -0.1208$ |
| [positive lens L22] | $\theta Ct1 - (0.0048 \times \nu d1) - 0.542 = -0.1406$ |
| [positive lens L33] | $\theta Ct1 - (0.0048 \times \nu d1) - 0.542 = -0.1406$ |

Conditional Expression (12)

| [negative meniscus lens L23] | $\theta Ct2 - (0.0048 \times \nu d2) - 0.542 = 0.0279$ |
| [negative lens L25]          | $\theta Ct2 - (0.0048 \times \nu d2) - 0.542 = 0.0181$ |

Conditional Expression (13)

| [positive lens L12] | $\theta Ct1 = 0.8175$ |
| [positive lens L21] | $\theta Ct1 = 0.8175$ |
| [positive lens L22] | $\theta Ct1 = 0.8399$ |
| [positive lens L33] | $\theta Ct1 = 0.8399$ |

Conditional Expression (14)

| [negative meniscus lens L23] | $\theta Ct2 = 0.7825$ |
| [negative lens L25]          | $\theta Ct2 = 0.7267$ |
| Conditional Expression (15)  | $(-Fh1)/Fh = 3.861$   |
| Conditional Expression (16)  | $Fh2/Fh = 0.838$      |
| Conditional Expression (17)  | $(-Fh3)/Fh = 1.118$   |
| Conditional Expression (18)  | $\nu 3d = 22.80$      |
|                              | $\nu 4d = 32.30$      |
| Conditional Expression (19)  | $(FOV/Fh) \times (NAob \times Fob) = 5.00$ |
| Conditional Expression (20)  | $\Phi b \times \theta b = 84.0$ |

Figure 15:
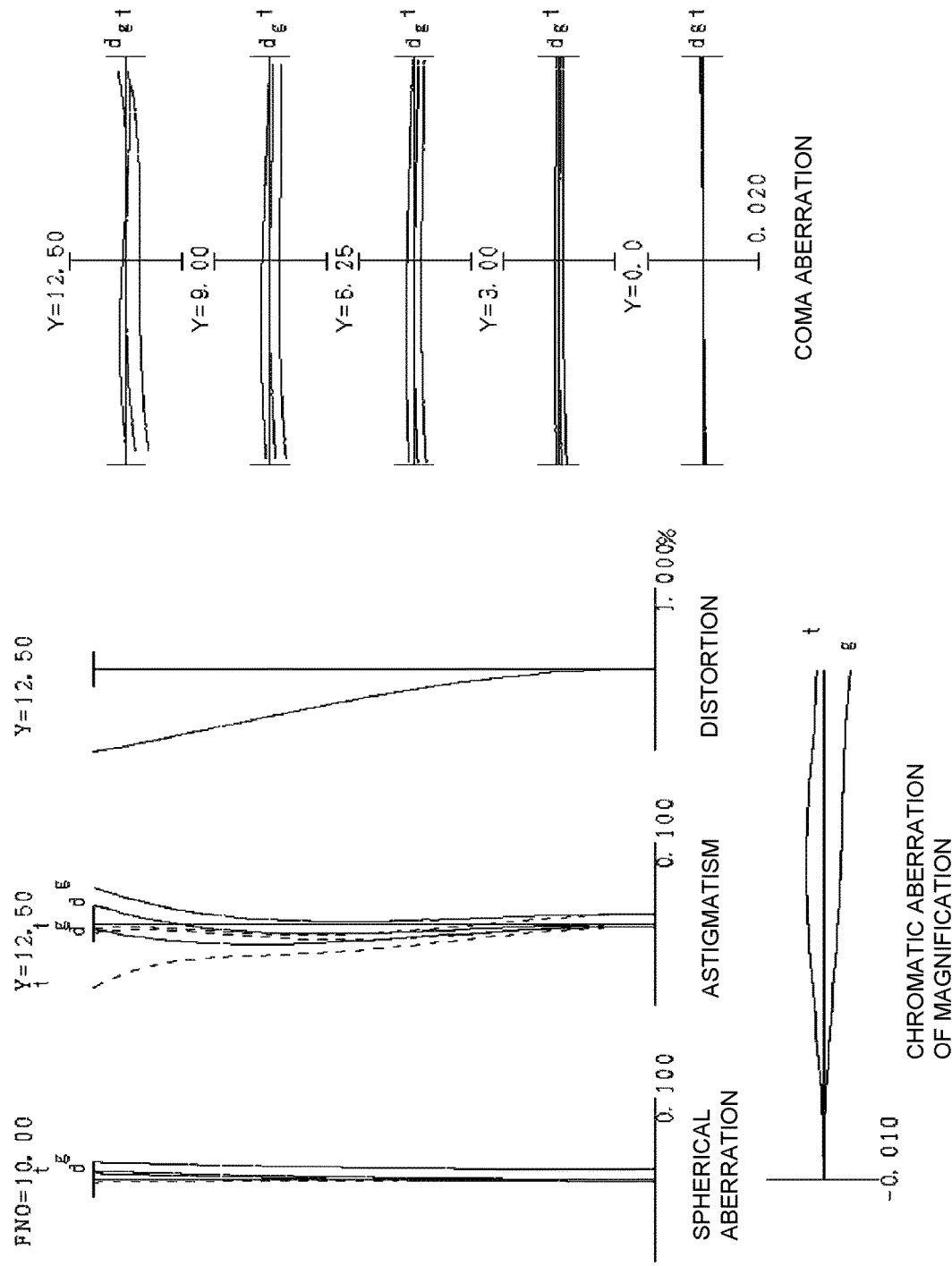
FIG. 15 shows various aberration graphs of the scanning optical system according to the seventh example.

FIG. 15 shows various aberration graphs of the scanning optical system according to the seventh example. Each aberration graph shows that in the scanning optical system according to the seventh example, various aberrations, such as the chromatic aberration of magnification, are favorably corrected in the wide wavelength region ranging from g-line to t-line, and the system has an excellent imaging performance.

According to each example described above, the scanning optical system that can reduce the chromatic aberration of magnification, and increase the field of view, can be achieved.

Here, each example described above shows a specific example of the first to sixth embodiments. Each embodiment is not limited thereto.

Figure 16:
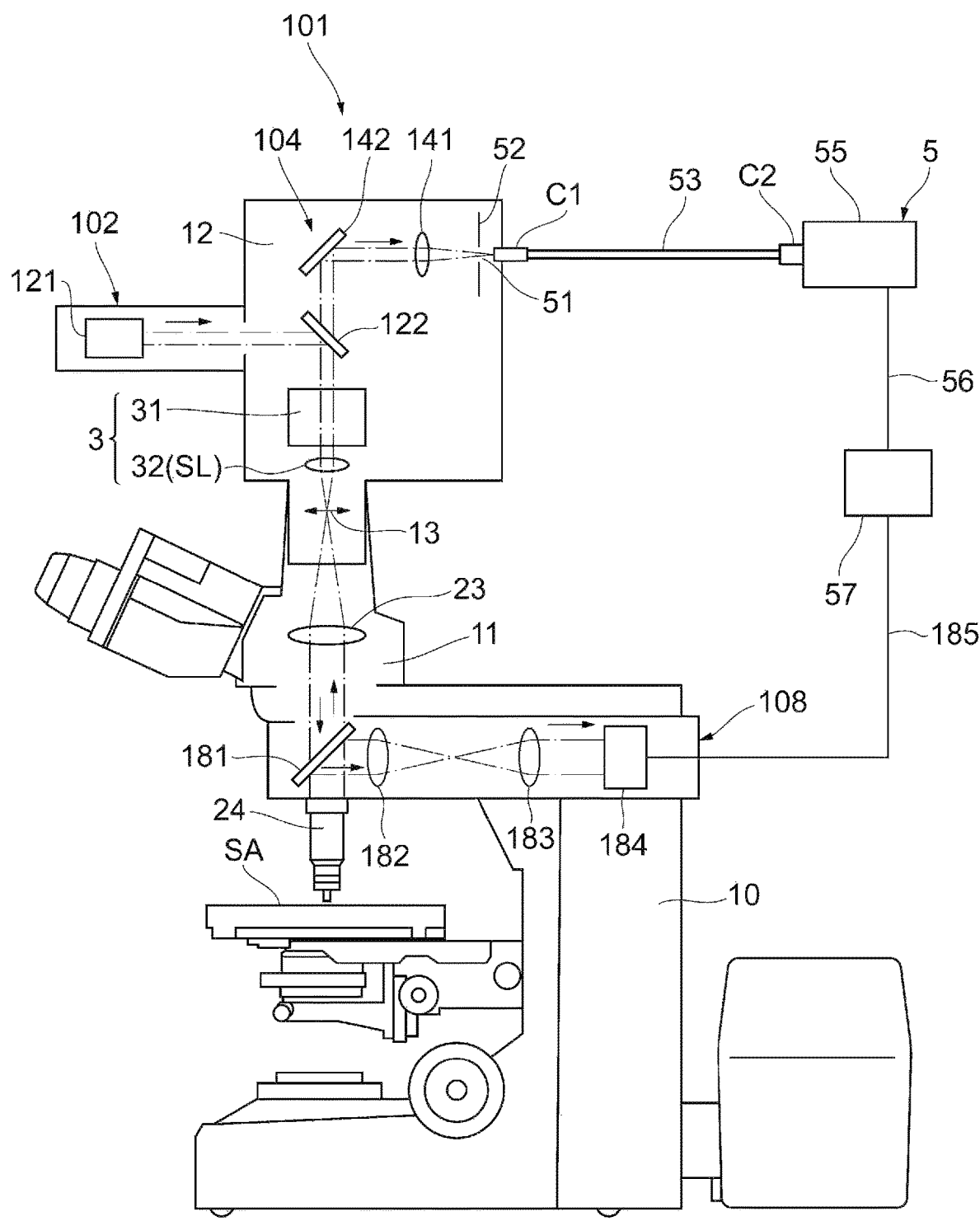
FIG. 16 illustrates a modified example of a scanning-type confocal microscope that comprises a scanning optical system.

Each of the microscopes including scanning optical systems according to the first to sixth embodiments is not limited to the scanning-type confocal microscope 1 shown in FIG. 1, and may be a multiphoton excitation scanning-type confocal microscope that supports fluorescent observation through multiphoton excitation. Referring to FIG. 16, a multiphoton excitation scanning-type confocal microscope 101 is described as a modified example of the scanning-type confocal microscope that comprises the scanning optical system according to the first to sixth embodiments. The multiphoton excitation scanning-type confocal microscope 101 mainly comprises: an excitation light guide 102 that guides laser light for illumination onto the sample SA; a scanning device 3 that deflects laser light to be collected on the sample SA and scans the sample SA; an optical detection device 5 that detects a light intensity signal from the sample SA; a second optical detection device 108 that detects a light intensity signal from the sample SA, the signal supporting multiphoton excitation; and a collective optical system 104 that guides light from the sample SA to the optical detection device 5. The multiphoton excitation scanning-type confocal microscope 101 has a configuration obtained by partially changing that of the scanning-type confocal microscope 1 described above. Among components of the multiphoton excitation scanning-type confocal microscope 101, components (e.g., the scanning device 3, the optical detection device 5, etc.) similar to those of the scanning-type confocal microscope 1 described above are assigned the same symbols as those in the case of the scanning-type confocal microscope 1, and detailed description thereof is omitted.

The excitation light guide 102 comprises: a light source unit 121 that includes a laser light source, and a beam diameter adjusting mechanism; and a dichroic mirror 122 that reflects pulse laser light (light flux) oscillated by the light source unit 121, toward the sample SA. The laser light reflected by the dichroic mirror 122 is collected on the sample SA by a second objective lens 23 and an objective lens 24. Note that the second objective lens 23 is arranged in a lens barrel 11 of a microscope main body 10, and the dichroic mirror 122 is arranged in a microscope housing 12 provided above the lens barrel 11.

The scanning device 3 comprises a scanning mechanism (scanner) 31, and a scanning optical system 32. The scanning device 3 is arranged between the dichroic mirror 122 in the microscope housing 12 and the second objective lens 23.

The collective optical system 104 comprises: the objective lens 24 and the second objective lens 23; a total reflection mirror 142 that reflects fluorescent light from the sample SA; and a first collective lens 141 that collects the fluorescent light reflected by the total reflection mirror 142 onto a shielding plate 52 that is of the optical detection device 5 and includes a pinhole 51. The total reflection mirror 142 and the first collective lens 141 are arranged above the dichroic mirror 122 in the microscope housing 12.

The optical detection device 5 comprises the shielding plate 52 that has the pinhole 51 (aperture), an optical fiber 53, and a detection unit 55. The shielding plate 52 is arranged in the microscope housing 12. The optical fiber 53 is connected to the microscope housing 12 and the detection unit 55 using respective connectors C1 and C2. A processing unit 57 is electrically connected to the detection unit 55 through a cable 56.

The second optical detection device 108 comprises a dichroic mirror 181 arranged between the objective lens 24 and the second objective lens 23, relay lenses 182 and 183, and a detection unit 184. The processing unit 57 is electrically connected to the detection unit 184 via a cable 185. Image processing (of the sample SA) based on a detection signal detected by the detection unit 184 is performed, and an observation image of the sample SA obtained through the image processing by the processing unit 57 is displayed on a monitor, not shown.

Note that the incident plane of the detection unit 184 in the second optical detection device 108 is arranged so as to be substantially conjugate with the pupil surface of the objective lens 24. According to the configuration to collect light on the sample SA through the objective lens 24, it is possible to allow fluorescent light passing through the objective lens 24, which is part of fluorescent light emitted by multiphoton excitation, to completely reach the detection unit 184. Accordingly, fluorescent light scattering in the sample SA can also be detected, which can obtain a brighter observation image (of the sample SA). In a case of a multiphoton excitation confocal microscope, a multiphoton excitation phenomenon occurs only in a minute region at a neighborhood of the focus of the objective lens 24. Accordingly, similar to a typical confocal microscope, an image at a neighborhood of the focal plane can be obtained, even without using a pinhole.

G1 First lens group  G2 Second lens group
G3 Third lens group  P Pupil conjugate surface
I Image surface

The invention claimed is:

1. A scanning optical system provided between an objective lens and a scanning mechanism, consisting of:
a first lens group having a negative refractive power; a second lens group having a positive refractive power; and a third lens group having a negative refractive power, the lens groups being arranged sequentially from a side of the scanning mechanism,
wherein
the first lens group consists of one cemented lens or one single lens,
the third lens group consists of two cemented lenses, and
at least one lens included in any of the first lens group, the second lens group and the third lens group has a positive refractive power, and satisfies the following conditional expression:

$vd1>80$, at least one lens included in any of the first lens group, the second lens group and the third lens group has a negative refractive power, and satisfies the following conditional expression:

$vd2<50$, the lens having the positive refractive power satisfies the following conditional expression:

$$\theta gF1-(-0.00168\times vd1)-0.644>0.03$$

the lens having the negative refractive power satisfies the following conditional expression:

$$\theta gF2-(-0.00168\times vd2)-0.644<-0.002, \text{ and}$$

where vd1: an Abbe number with reference to d-line of the lens having the positive refractive power, defined by the following expression:

$$vd1=(nd1-1)/(nF1-nC1), \text{ and}$$

wherein a refractive index of the lens having the positive refractive power for d-line is nd1, a refractive index of the lens having the positive refractive power for F-line is nF1, and a refractive index of the lens having the positive refractive power for C-line is nC1, vd2: an Abbe number with reference to d-line of the lens having the negative refractive power, defined by the following expression:

$$vd2=(nd2-1)/(nF2-nC2),$$

wherein a refractive index of the lens having the negative refractive power for d-line is nd2, a refractive index of the lens having the negative refractive power for F-line is nF2, and a refractive index of the lens having the negative refractive power for C-line is nC2, where θgF1: a partial dispersion ratio of the lens having the positive refractive power, defined by the following expression:

$$\theta gF1=(ng1-nF1)/(nF1-nC1),$$

wherein a refractive index of the lens having the positive refractive power for g-line is ng1, θgF2: a partial dispersion ratio of the lens having the negative refractive power, defined by the following expression:

$$\theta gF2=(ng2-nF2)/(nF2-nC2),$$

wherein a refractive index of the lens having the negative refractive power for g-line is ng2.

2. The scanning optical system according to claim 1, wherein
the lens having the positive refractive power satisfies the following conditional expression:

$$0gF1<0.55, \text{ and}$$

the lens having the negative refractive power satisfies the following conditional expression:

$$0gF2>0.56.$$

3. The scanning optical system according to claim 1, wherein the scanning optical system satisfies the following conditional expression:

$$0.35<FOV/Fh<0.55 \quad (10)$$

where FOV: a maximum number of fields of view of the scanning optical system, and
Fh: a focal length of the scanning optical system.

4. The scanning optical system according to claim 1, wherein
the lens having the positive refractive power satisfies the following conditional expression:

$$\theta Ct1-(0.0048\times vd1)-0.542<-0.05, \text{ and}$$

the lens having the negative refractive power satisfies the following conditional expression:

$$\theta Ct2-(0.0048\times vd2)-0.542>0.01$$

where θCt1: a partial dispersion ratio of the lens having the positive refractive power, defined by the following expression:

$$\theta Ct1=(nC1-nt1)/(nF1-nC1),$$

wherein a refractive index of the lens having the positive refractive power for t-line is nt1, where θct2: a partial dispersion ratio of the lens having the negative refractive power, defined by the following expression:

$$\theta Ct2=(nC2-nt2)/(nF2-nC2),$$

wherein a refractive index of the lens having the negative refractive power for t-line is nt2.

5. The scanning optical system according to claim 4, wherein
the lens having the positive refractive power satisfies the following conditional expression:

$$\theta Ct1>0.79, \text{ and}$$

where the lens having the negative refractive power satisfies the following conditional expression:

$$\theta Ct2<0.8.$$

6. The scanning optical system according to claim 1, wherein the scanning optical system satisfies the following conditional expressions:

$$1.5<(-Fh1)/Fh<5.0,$$

$$0.6<Fh2/Fh<0.9, \text{ and}$$

$$0.8<(-Fh3)/Fh<1.3$$

where Fh1: the focal length of the first lens group,
Fh2: the focal length of the second lens group,
Fh3: the focal length of the third lens group G3, and
Fh: the focal length of the scanning optical system.

7. The scanning optical system according to claim 3, wherein the following conditional expression is satisfied:

$$h \text{ max} \geq 18.0 \text{ [mm]}$$

where h max: a maximum distance between an optical axis and a principal ray defining a maximum image height among principal rays passing through a back focus of the objective lens.

8. The scanning optical system according to claim 3, wherein the following conditional expression is satisfied:

$$FOV \geq 23 \text{ [mm]}$$

where FOV: a maximum number of fields of view of the scanning optical system.

9. The scanning optical system according to claim 7, wherein the following conditional expression is satisfied:

$$\Phi max \geq 48.0 \text{ [mm]}$$

where Φmax: a maximum outer diameter of the scanning optical system.

10. A scanning-type microscope, comprising: a light source, an objective lens, a scanning mechanism which scans a light from the light source on a sample through the objective lens, and a scanning optical system provided between the objective lens and the scanning mechanism, wherein:
the scanning optical system comprises:
a first lens group having a negative refractive power; a second lens group having a positive refractive power; and a third lens group having a negative refractive power, the lens groups being arranged sequentially from a side of the scanning mechanism, wherein a lens surface of a lens of the first lens group arranged closest to the scanning mechanism is a concave surface, a lens surface of a lens of the third lens group arranged closest to the objective lens is a concave surface, at least one lens included in any of the first lens group, the second lens group and the third lens group has a positive refractive power, and satisfies the following conditional expression:

$$\theta gF1-(-0.00168 \times vd2)-0.644<0.03, \text{ and}$$

at least one lens included in any of the first lens group, the second lens group and the third lens group has a negative refractive power, and satisfies the following conditional expression:

$$\theta gF2-(-0.00168 \times vd2)-0.644<-0.002$$

where θgF1: a partial dispersion ratio of the lens having the positive refractive power, defined by the following expression:

$$\theta gF1=(ng1-nF1)/(nF1-nC1),$$

wherein a refractive index of the lens having the positive refractive power for g-line is ng1, a refractive index of the lens having the positive refractive power for F-line is nF1, and a refractive index of the lens having the positive refractive power for C-line is nC1, θgF2: a partial dispersion ratio of the lens having the negative refractive power, defined by the following expression:

$$\theta gF2=(ng2-nF2)/(nF2-nC2),$$

wherein a refractive index of the lens having the negative refractive power for g-line is ng2, a refractive index of the lens having the negative refractive power for F-line is nF2, and a refractive index of the lens having the negative refractive power for C-line is nC2.

11. The scanning-type microscope according to claim 10, wherein the second lens group includes at least one cemented lens having positive refractive power.

12. The scanning-type microscope according to claim 10, wherein the third lens group includes a first cemented lens and a second cemented lens that are arranged sequentially from the scanning mechanism.

13. The scanning-type microscope according to claim 12, wherein a concave surface facing to the objective lens in a lens provided closest to the objective lens in the third lens group corresponds to a lens surface facing to the objective lens in the second cemented lens.

14. The scanning-type microscope according to claim 12, wherein the scanning optical system satisfies the following conditional expression:

$$vd3<vd4$$

where vd3: an Abbe number with reference to d-line of a positive lens included in the first cemented lens, defined by the following expression:

$$vd3=(nd3-1)/(nF3-nC3)$$

wherein a refractive index of the positive lens for d-line is nd3, a refractive index of the positive lens for F-line is nF3, and a refractive index of the positive lens for C-line is nC3, where vd4: an Abbe number with reference to d-line of a negative lens included in the first cemented lens, defined by the following expression:

$$vd4=(nd4-1)/(nF4-nC4),$$

wherein a refractive index of the negative lens for d-line is nd4, a refractive index of the negative lens for F-line is nF4, and a refractive index of the negative lens for C-line is nC4.

15. The scanning-type microscope according to claim 10, satisfying the following conditional expression:

$$(FOV/Fh) \times (NAob \times Fob)>3.1 \text{ [mm]}$$

where FOV: a maximum number of fields of view of the scanning optical system,

Fh: a focal length of the scanning optical system,

NAob: a numerical aperture of the objective lens, and

Fob: a focal length of the objective lens.

16. The scanning-type microscope according to claim 10, wherein the light source supplies a laser beam light, and the scanning mechanism scans the laser beam light from the light source on a sample through the objective lens, and the following conditional expression is satisfied:

$$\Phi b \times \theta b>63 \text{ [mm} \times \text{degrees]}$$

where Φb: a diameter of laser light incident from the scanning mechanism onto the scanning optical system, and θb: a maximum angle between the optical axis and the laser light incident from the scanning mechanism onto the scanning optical system.

* * * * *